(12) United States Patent
Yasui et al.

(10) Patent No.: US 7,000,601 B2
(45) Date of Patent: Feb. 21, 2006

(54) SUPERCHARGER WITH A PLANETARY GEAR MECHANISM

(75) Inventors: Yuji Yasui, Saitama (JP); Yutaka Tamagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/838,528

(22) Filed: May 5, 2004

(65) Prior Publication Data

US 2004/0237949 A1    Dec. 2, 2004

(30) Foreign Application Priority Data

Jun. 2, 2003    (JP) .............................. 2003-156554

(51) Int. Cl.
 *F02B 33/00* (2006.01)
 *F16H 3/44* (2006.01)
 *B60K 1/02* (2006.01)

(52) U.S. Cl. .................. 123/561; 123/559.3; 475/287; 477/3

(58) Field of Classification Search .......... 60/607–609; 123/559.1, 561, 559.3; 477/3; 475/287
See application file for complete search history.

(56) References Cited

U.S. PATENT DOCUMENTS 3,007,302 A * 11/1961 Vincent ........................ 60/607
5,012,906 A * 5/1991 Meyer et al. .................. 60/608
5,751,137 A * 5/1998 Kiuchi et al. ................. 60/608
5,875,766 A * 3/1999 Ozawa ........................ 123/561
5,890,468 A * 4/1999 Ozawa ........................ 123/561
6,751,957 B1 * 6/2004 Morgan et al. ............... 60/608
6,845,832 B1 * 1/2005 Takizawa et al. ............ 475/287
6,863,139 B1 * 3/2005 Egami et al. ................... 477/3

FOREIGN PATENT DOCUMENTS

| JP | 62131920 A | * 6/1987 | .............. 123/559.3 |
|---|---|---|---|
| JP | 07-259576 | 10/1995 | |
| JP | 08-200083 | 8/1996 | |
| JP | 2002-317640 | 10/2002 | |

* cited by examiner

*Primary Examiner*—Thai-Ba Trieu
(74) *Attorney, Agent, or Firm*—Arent Fox PLLC

(57) ABSTRACT

A supercharger of an engine comprises a motor/generator, a compressor provided in an air intake system of the engine, and a planetary gear mechanism. The planetary gear mechanism includes a sun gear connected to a driving shaft of the engine, planetary gears connected to the motor/generator and a ring gear connected to the compressor. The controller drives the motor/generator to control a rotational speed of the planetary gears. Through the control of the rotational speed of the planetary gears, a rotational speed of the compressor is controlled independently of a rotational speed of the engine. Thus, the rotation speed of the compressor can be continuously changed over a range from zero to a higher rotational speed than the engine rotational speed. Any desired supercharged pressure can be generated independently of the engine rotational speed.

36 Claims, 17 Drawing Sheets

(a)

(b)

SUPERCHARGER WITH A PLANETARY GEAR MECHANISM

BACKGROUND OF THE INVENTION

The present invention relates to a supercharger of an internal combustion engine.

A supercharger of an internal combustion engine comprises a compressor for pressurizing air. The pressurized air is supplied to each cylinder of the engine. Thus, the amount of air taken into the combustion chamber of the cylinder increases, increasing the engine output.

As to a supercharger, a turbocharger and a mechanical supercharger are known. According to the turbocharger, the energy of exhaust gas rotates the turbine. The turbine rotates a compressor. Such a turbocharger is disclosed in, for example, Japanese Patent Application Unexamined Publication (Kokai) No. 2002-317640. According to the mechanical supercharger, a driving shaft of an engine rotates a compressor.

A motor may be used for rotating the compressor. For example, a turbocharger may comprise a motor between the turbine and the compressor. When the volume of exhaust gas is low, the motor rotates the compressor. Such a turbocharger is disclosed in, for example, Japanese Patent Application Unexamined Publication (Kokai) No. H07-259576.

According to another example, the mechanical supercharger may comprise a motor. The driving force of an engine is converted into electric power, by which the motor is driven. The motor rotates the compressor. According to yet another example, a supercharger may comprise an oil hydraulic pump that is driven by the engine. The turbine is driven by high pressure oil. Such a supercharger is disclosed in, for example, Japanese Patent Application Unexamined Publication (Kokai) No. H08-200083.

Since the turbocharger utilizes the energy of exhaust gas, energy efficiency is high. However, the turbine provided in the exhaust system may cause a rise in the exhaust gas pressure. If the exhaust gas pressure is high when the engine load is high, an engine knocking tends to occur and a pumping loss may increase. When the engine load is low, the volume of exhaust gas decreases, which may lead to a shortage of the supercharged pressure. In some vehicles, control for quickly activating the catalyst by the heat of exhaust gas is performed. If the exhaust gas is used for driving the turbine, the time required for activating the catalyst may be long.

The turbocharger with a motor may solve the shortage of the supercharged pressure. However, the above problems regarding the rise in the exhaust gas pressure and the time required for activating the catalyst are not solved.

Since the mechanical supercharger utilizes rotation of a driving shaft of the engine, the supercharged pressure quickly responds to an engine driving force that is requested by the driver. Since a turbine does not need to be provided in the exhaust system, the time for activating the catalyst is appropriately maintained. However, since rotation of the driving shaft of the engine is required, a loss of the engine output (which is referred to as a "driving loss") may occur in accordance with an increase in the amount of supercharged air.

According to the mechanical supercharger with a motor, the energy efficiency is low since the engine driving force is converted into electric power and then the electric power is converted into the motor driving force.

Thus, one object of the present invention is to provide a new supercharger that can overcome the above-described disadvantages of the turbocharger and the mechanical supercharger. Such a new supercharger can generate a desired engine output over a wide range of the engine rotational speed.

SUMMARY OF THE INVENTION

According to one aspect of the invention, a supercharger of an engine comprises a motor/generator, a compressor provided in an intake air system of the engine, and a planetary gear mechanism. The planetary gear mechanism includes a first gear, a second gear and a third gear. The first gear is connected to a driving shaft of the engine. The second gear is connected to the motor/generator. The third gear is connected to the compressor. A controller drives the motor/generator to control a rotational speed of the second gear. Through the control of the rotational speed of the second gear, a rotational speed of the compressor is controlled independently of a rotational speed of the engine.

According to the invention, the rotational speed of the compressor can be continuously changed from zero to a higher rotational speed than the rotational speed of the engine. Since the rotational speed of the compressor can be controlled independently of the rotational speed of the engine, a desired supercharged pressure is generated at any rotational speed of the engine.

According to one embodiment of the invention, the second gear includes planetary gears. The motor/generator is connected to a carrier of the planetary gears. The carrier defines an orbital motion of the planetary gears around the first gear. In one embodiment, the first gear is a sun gear and the third gear is a ring gear.

According to one embodiment of the invention, when a driving force of the engine requested by a driver exceeds a predetermined value, the motor/generator is driven so that the compressor rotates at a higher rotational speed than the rotational speed of the engine. When a driving force of the engine requested by a driver is less than a predetermined value, the motor/generator is driven so that the compressor rotates at a lower rotational speed than the rotational speed of the engine or so that the compressor stops.

When the compressor rotates at a higher rotational speed than the rotational speed of the engine, the motor/generator is driven as an electric motor. When the compressor rotates at a lower rotational speed than the rotational speed of the engine, the motor/generator is driven as an electric generator.

When the motor/generator is driven as an electric motor, electric power is supplied to the motor/generator. The compressor can rotate at a higher rotational speed than the rotational speed of the engine (assist mode). As the amount of electric power to the motor/generator increases, the rotational speed of the compressor increases.

When the motor/generator is driven as an electric generator, electric energy from the motor/generator is regenerated. The compressor can rotate at a lower rotational speed than the rotational speed of the engine (regeneration mode). As the amount of electric power generation increases, the rotational speed of the compressor decreases. Since the electric energy from the motor/generator is regenerated, for example, to charge a battery, energy efficiency is improved.

Thus, the compressor can rotate at any desired speed independently of the rotational speed of the engine. It is prevented that a shortage of the supercharged pressure occurs and that excessive supercharged pressure is generated.

According to another embodiment of the invention, the supercharger includes an electric generator that is connected to the engine. When the motor/generator is driven as an electric motor, electric power is supplied from the electric generator to the motor/generator. By utilizing the electric generator, the rotational speed of the compressor can be increased regardless of the level of charge of the battery.

According to one embodiment of the invention, operation of the electric generator is stopped when an accelerator pedal is full open or almost full open. Increasing the rotational speed of the compressor is carried out only by the electric power from the battery. Since the electric generator is stopped, it is prevented that the engine output is consumed to operate the electric generator.

According to yet another embodiment of the invention, a response assignment control is performed to generate a motor command for driving the motor/generator so that the supercharged pressure converges to a desired value.

Supercharging may cause a large delay because air compression by the compressor takes some time. Such a delay may cause overshooting in the supercharged pressure. The response assignment control can cause the supercharged pressure to converge to the desired value without overshooting. Thus, vehicle drivability is improved.

According to yet another embodiment of the invention, the amount of intake air to the engine is adjusted by an opening angle of the throttle valve. In one embodiment, a response assignment control is performed to determine the opening angle of the throttle valve so that the amount of intake air to the engine converges to a desired value.

Since supercharging has a delay, control of the supercharged pressure may not make a fine adjustment of the amount of intake air. The control of the throttle valve can implement such a fine adjustment. The control of the opening angle of the throttle valve can cause the amount of intake air to the engine to follow a desired value with high accuracy.

There is a delay in the control that causes the amount of intake air to the engine to converge to a desired value because air is temporarily held in the intake air manifold prior to being taken into the cylinder of the engine. Such a delay may cause overshooting in the amount of intake air. The response assignment control can adjust the opening angle of the throttle valve so that the amount of intake air converges to a desired value without overshooting.

According to yet another embodiment of the invention, the supercharger further comprises a one-way clutch between the motor/generator and the compressor. Excessive electric power generation of the motor/generator may cause reverse rotation of the compressor. A one-way clutch prevents such reverse rotation of the compressor while increasing the amount of electric power generation from the motor/generator.

DESCRIPTION OF THE PREFERRED EMBODIMENTS

Structure of Internal Combustion Engine, Supercharger and Control Unit

Figure 1:
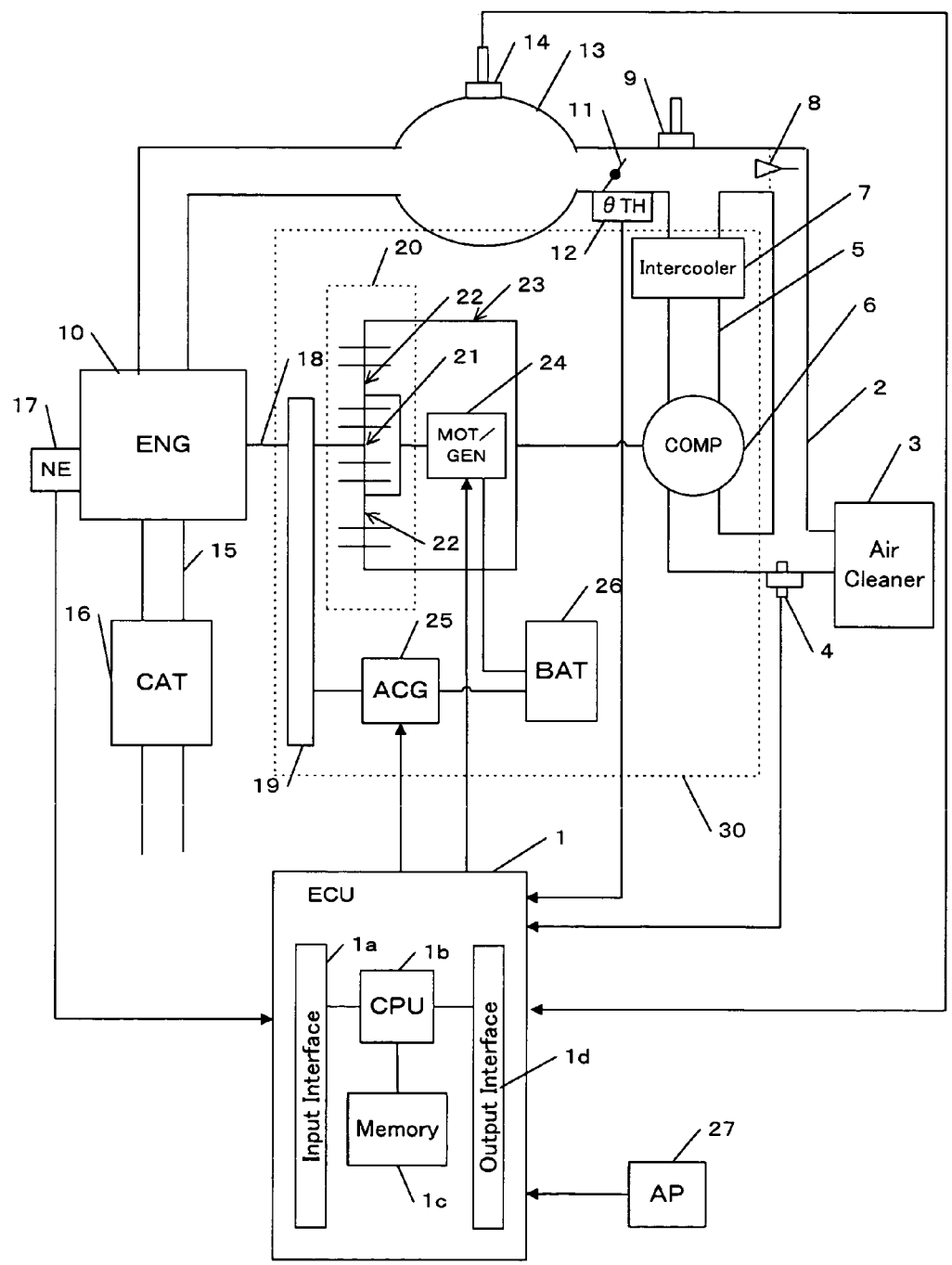
FIG. 1 is a block diagram of an internal combustion engine, a supercharger and a control unit in accordance with one embodiment of the present invention.

Referring to the drawings, specific embodiments of the invention will be described. FIG. 1 is a block diagram showing an internal combustion engine (hereinafter referred to as an engine), supercharger and a control unit in accordance with one embodiment of the invention.

An electronic control unit (hereinafter referred to as an ECU) 1 comprises an input interface 1*a* for receiving data sent from each part of the vehicle, a CPU 1b for carrying out operations for controlling each part of the vehicle, a memory 1c including a read only memory (ROM) and a random access memory (RAM), and an output interface id for sending control signals to each part of the vehicle. Programs and various data for controlling each part of the vehicle are stored in the ROM. The ROM may be a rewritable ROM such as an EPROM. The RAM provides work areas for operations by the CPU 1b, in which data sent from each part of the vehicle as well as control signals to be sent out to each part of the vehicle are temporarily stored.

Air is introduced into an intake passage 2 connected to an engine 10 through an air cleaner 3. The amount of the intake air is detected by an airflow meter 4.

A compressor 6 and an intercooler 7 are provided in a supercharging passage 5 that is arranged in parallel with the intake air passage 2. The air compressed by the compressor 6 is cooled down by the intercooler 7.

A supercharging valve 8 is provided in the intake passage 2. The supercharging valve 8 is a one-way valve, which is structured to be closed when a supercharging process is performed. This valve 8 acts to prevent the air compressed by the compressor 6 from flowing back to the intake passage 2.

A supercharged pressure (Pc) sensor 9 is provided at a point where the supercharging passage 5 is connected to the intake passage 2. The supercharged pressure sensor 9 detects a pressure of air flowing from the intercooler 7 to the intake air passage 2, hereinafter referred to as a supercharged pressure. The detected supercharged pressure is sent to the ECU 1.

A throttle valve 11 is provided in the intake passage 2. The opening angle of the throttle valve 11 is controlled by a control signal from the ECU 1. The amount of air introduced into the engine 10 may be controlled by adjusting the opening angle of the throttle valve 11. A throttle valve opening (θTH) sensor 12 detects an opening angle of the throttle valve 11 and sends it to the ECU 1.

An intake manifold pressure (Pb) sensor 14 is provided in the chamber 13. The intake manifold sensor 14 detects a pressure Pb of air filled in the chamber 13 and sends it to the ECU 1.

A catalyst converter 16 is provided in an exhaust passage 15 that is connected to the engine 10. The catalyst converter 16 purifies undesired substances such as HC, CO, NOx included in the exhaust gas passing through the exhaust passage 15.

A rotational speed (Ne) sensor 17 is attached to the periphery of the camshaft or the periphery of the crankshaft (not shown) of the engine 2. An engine rotational speed detected by the sensor 17 is sent to the ECU 1.

A planetary gear mechanism 20 comprises a sun gear 21, a plurality of planetary gears 22 and a ring gear 23. The sun gear 21 is connected to the crankshaft (that is, a driving shaft) 18 of the engine 10 through an accessory belt 19, so that the sun gear rotates in accordance with the rotation of the crankshaft 18.

A motor/generator 24 is connected to a carrier of the planetary gears 22. The motor/generator 24 acts not only as an electric motor but also as an electric generator. The motor/generator 24 receives a motor command generated by the ECU 1 and drives the planetary gears 22 in accordance with the received command.

The compressor 6 is connected to the ring gear 23. The compressor 6 rotates in accordance with the rotation of the ring gear 23.

An electric generator (ACG) 25 is connected to the engine 10 via the accessory belt 19. The electric generator 25 is driven by a driving force of the engine that is transmitted through the driving shaft of the engine.

A battery (or a capacitor) 26 is connected to the electric generator 25 and the motor/generator 24. The motor/generator 24 may be supplied with electric power from the generator 25 and/or the battery 26.

An accelerator pedal opening sensor 27 detects an opening angle AP of an accelerator pedal and sends it to the ECU 1.

Signals sent to the ECU 1 are passed to the input interface 1a. The input interface 1a converts analog signal values into digital signal values. The CPU 1b processes the resulting digital signals, performs operations in accordance with the programs stored in the ROM 1c, and creates control signals. The output interface id sends these control signals to actuators for the fuel injection valve 12 and other actuators.

FIG. 2(a) schematically shows a front view of the planetary gear mechanism 20. FIG. 2(b) schematically shows a cross-sectional view of the planetary gear mechanism 20.

The sun gear 21 is connected to the crankshaft 18 of the engine. The carrier 28 of the planetary gears 22 is connected to the motor/generator 24. The ring gear 23 is connected to the compressor 6. The planetary gears 22 revolve around the sun gear 21 in accordance with the rotation of the carrier 28.

Figure 2:
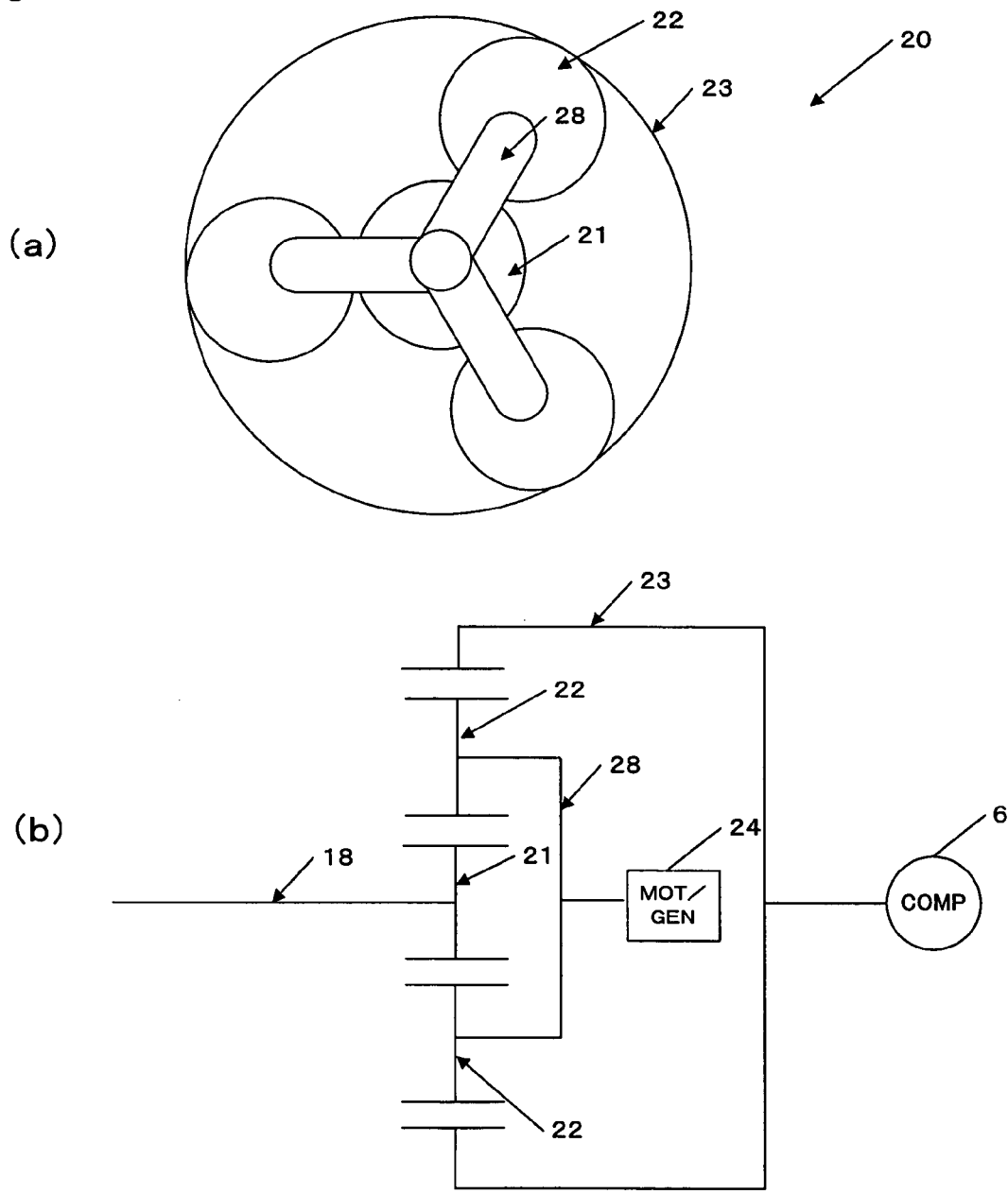
FIG. 2 shows a schematic structure of a planetary gear mechanism in accordance with one embodiment of the present invention.

Although the number of the planetary gears 22 shown in FIG. 2(a) is three, the present invention is not limited to such embodiment. Although the diameter of the sun gear 21 appears to be the same length as the diameter of the planetary gears 22 in FIG. 2, the present invention is not limited to such embodiment.

The sun gear 21 rotates in accordance with the rotation of the crankshaft 18 of the engine. When the carrier 28 is not driven by the motor/generator 24, the carrier rotates at the same rotational speed as the sun gear 21.

A rotational speed of the carrier 28 can be controlled by the motor/generator 24. When the motor/generator 24 acts as an electric motor, the carrier 28 can rotate at a higher rotational speed than the engine rotational speed NE. As the amount of electric power supply to the motor/generator 24 increases, the rotational speed of the carrier 28 increases. As the rotational speed of the carrier 28 increases, the rotational speed of the ring gear 23 increases. Thus, the rotational speed of the compressor 6 increases.

On the other hand, when the motor/generator 24 acts as an electric generator, the carrier 28 can rotate at a lower rotational speed than the engine rotational speed NE. As the amount of electric power generation from the motor/generator 24 increases, the rotational speed of the carrier 28 decreases. As the rotational speed of the carrier 28 decreases, the rotational speed of the ring gear 23 decreases. Thus, the rotational speed of the compressor 6 decreases.

By controlling the rotational speed of the carrier 28 through the motor/generator 24, the rotational speed of the ring gear 23 can be controlled independently of the rotational speed of the sun gear 21. In other words, the rotational speed of the compressor 6 can be continuously changed from zero to a higher rotational speed than the engine rotational speed NE. Thus, regardless of the engine rotational speed NE, the compressor 6 can be rotated at a speed where a desired supercharged pressure is generated.

Alternatively, the ring gear may be connected to the driving shaft of the engine. In such a case, the sun gear may be connected to the compressor.

Figure 3:
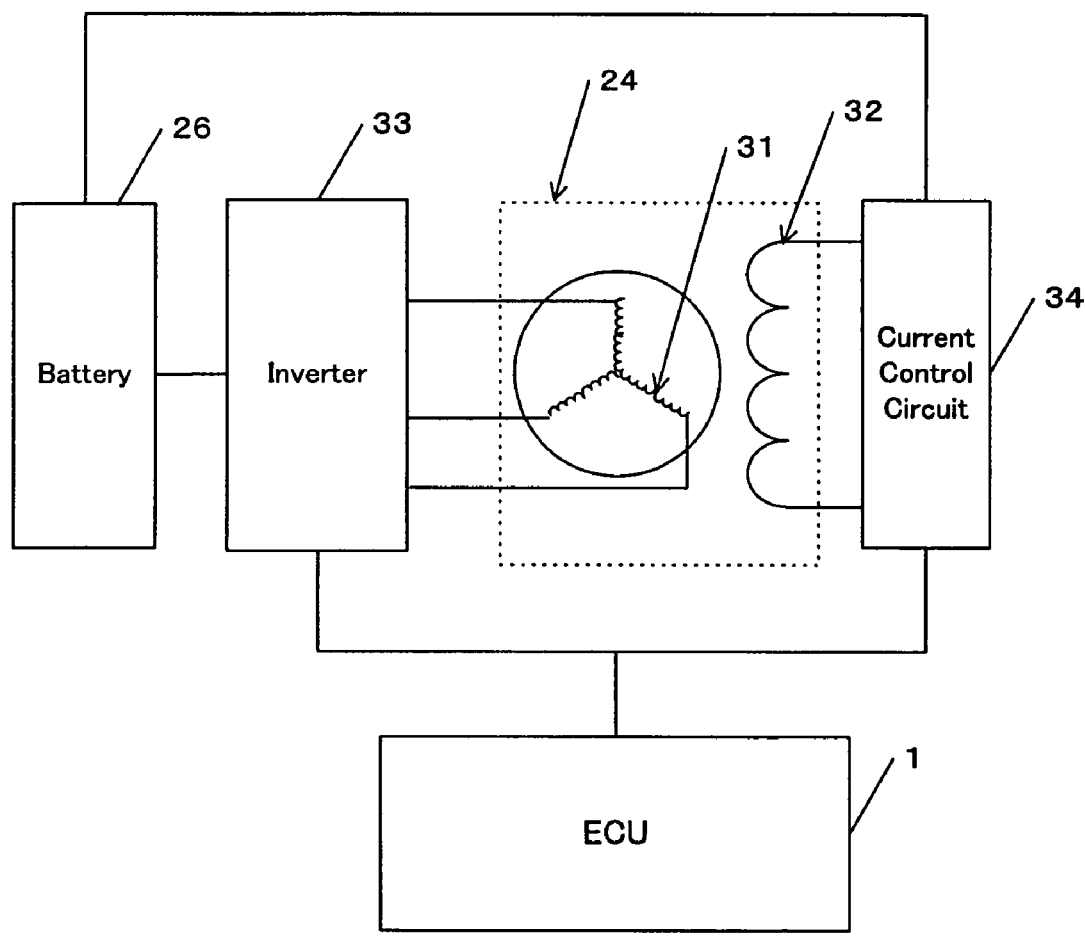
FIG. 3 shows a schematic structure of a mechanism for driving a motor/generator in accordance with one embodiment of the present invention.

FIG. 3 shows an exemplary circuit for driving the motor/generator 24. The motor/generator 24 is, for example, a common three-phase motor, in which an armature 31 is provided. The armature 31 is connected to the carrier 28 (FIG. 2).

An inverter 33 is connected to the armature 31. The inverter 33 supplies three phase alternating current to the armature 31 when the motor/generator 24 is actuated as an electric motor. The inverter 33 rectifies current generated by the motor/generator 24 when the motor/generator 24 is actuated as an electric generator. The rectified current charges the battery 26.

The motor/generator 24 further comprises a field coil 32. The field coil 32 is connected to a current control circuit 34, which controls a field current that is fed to the field coil 32. A magnetic field is generated by the field current.

When the motor/generator 24 is actuated as an electric motor, the ECU 1 sends a motor command having a positive value to the inverter 33. The current control circuit 34 feeds a predetermined field current to the field coil 32 to generate the magnetic field. The inverter 33 supplies the armature 31 with current in accordance with a magnitude of the motor command. Such current rotates the armature 31, thereby rotating the carrier 28. As the magnitude of the current flowing through the armature 31 increases, the rotational speed of the carrier 28 increases.

When the ECU 1 sends a motor command having zero value to the inverter 33 and the current control circuit 34, the motor/generator 24 stops. In other words, the inverter 33 stops supplying the current to the armature 31, and the current control circuit 34 stops supplying the field current to the field coil 32. The armature 31 and the carrier 28 rotate at the same rotational speed as the rotational speed of the driving shaft (that is, the engine rotational speed NE).

When the motor/generator 24 is actuated as an electric generator, the ECU 1 sends a motor command having a negative value to the current control circuit 34. The current control circuit 34 supplies the field coil 32 with a current in accordance with the magnitude of the absolute value of the motor command. Current generated by the motor/generator 24 is rectified by the inverter 33. The rectified current charges the battery 26.

Thus, the current control circuit 34 adjusts the magnitude of the field current supplied to the field coil 32. Through such adjustment, the amount of electric power generation from the motor/generator 24 can be controlled. If the electric energy regenerated from the motor/generator 24 to the battery 26 is greater than the rotational (kinetic) energy generated by the driving shaft, the rotational speed of the armature 31 decelerates. As the amount of the electric energy from the motor/generator 24 (that is, the amount of the electric power generation of the motor/generator 24) increases, a force braking the rotation of the armature 31 increases. Thus, the rotational speed of the carrier 28 decreases.

The circuit for driving the motor/generator 24 as shown in FIG. 3 is one example. Any other known circuits may be used for driving the motor/generator 24.

Alternatively, any other appropriate methods may be used for controlling the electric power generation when the motor/generator 24 is actuated as an electric generator. For example, a method is known for controlling the electric power generation by supplying phase-controlled current to the armature.

It should be noted that the motor/generator 24 can be supplied with the electric power from not only the battery 26 as shown in FIG. 3 but also the electric generator 25 connected to the engine as shown in FIG. 1.

For the purpose of simplicity, in the following description, it is assumed that the inverter 33 and the current control circuit 34 are components contained in the motor/generator 24. The motor command is sent from the ECU 1 to the motor/generator 24.

Operation of Supercharger

Figure 4:
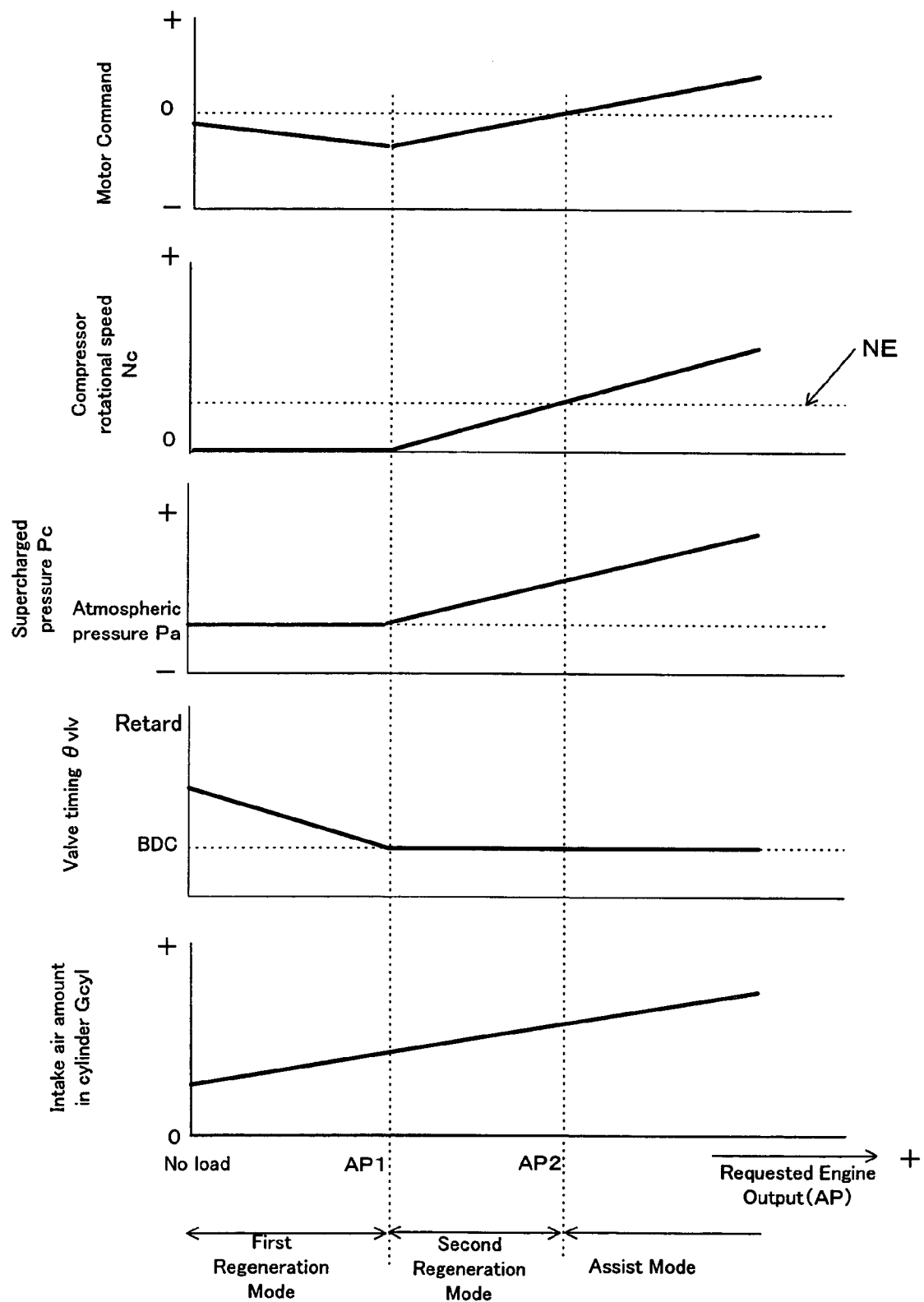
FIG. 4 schematically shows behavior of various parameters relative to engine load in accordance with one embodiment of the present invention.

FIG. 4 shows behavior of various parameters relative to the engine output (or driving force of the engine) that is requested by a driver in an engine control process in accordance with one embodiment of the present invention. It is assumed that the engine rotational speed NE is maintained at a given value. The engine output requested by the driver is typically represented by an opening angle AP of the accelerator pedal.

In a first regeneration mode, the engine output requested by the driver ranges from zero (that is, there is no engine load) to AP1. Supercharging is not performed in the first regeneration mode. A motor command is generated to make the rotational speed Nc of the compressor 6 zero. This motor command has a negative value so that the motor/generator 24 acts as an electric generator. Electric energy from the motor/generator 24 is regenerated to charge the battery 26.

In order to make the rotational speed Nc of the compressor zero, rotational energy generated by the driving force of the engine needs to be cancelled by the electric energy. As the opening angle of the accelerator pedal decreases, the driving force of the engine decreases, and hence the resultant rotational energy decreases. As the rotational energy decreases, a force braking the rotation of the carrier 28 decreases. Thus, the absolute value of the motor command is established so that it decreases with a decrease in the accelerator pedal opening AP. Since supercharging is not performed, the supercharged pressure Pc detected by the supercharged pressure sensor 9 is almost equal to the atmospheric pressure Pa.

In this embodiment, a variable valve-timing mechanism that is capable of changing the amount of lift of the intake/exhaust vale is employed. In the first regeneration mode, the amount of intake air Gcyl to the engine is controlled by adjusting the amount of retarding the valve timing $\theta vlv$ for closing the intake valve. As the amount of retarding the valve timing decreases (in other words, as the valve timing $\theta vlv$ approaches BDC), the intake air amount Gcyl increases. The opening angle of the throttle valve 11 is set to a value equal to a full open or an almost full open.

According to a usual valve timing mechanism, the intake valve is typically closed when an intake stroke is finished. According to the variable valve-timing mechanism, the intake valve is closed during a compression stroke that is performed after the intake stroke. The amount of retarding the valve timing for closing the intake valve indicates how much the timing for closing the intake valve deviates from the start time of the compression stroke (that is, BDC).

The volume of air in the engine cylinder can be changed by adjusting the amount of retarding the valve timing. If the pressure of air in the cylinder is constant, the amount of intake air to the engine changes in accordance with the volume of air in the cylinder. Thus, the amount of intake air to the engine is adjusted by controlling the amount of retarding the valve timing for closing the intake valve. According to the variable valve-timing mechanism, a pumping loss is suppressed because there is no need to make the pressure of the intake manifold negative.

In a second regeneration mode, the requested engine output ranges from AP1 to AP2. The rotational speed Nc of the compressor is set to be lower than the engine rotational speed NE. Supercharging is performed. A motor command is generated so that the compressor rotational speed Nc corresponding to a desired supercharged pressure Pc is achieved. This motor command has a negative value so that the motor/generator 24 acts as an electric generator. Electric energy from the motor/generator 24 is regenerated to charge the battery 26.

As the absolute value of the motor command decreases, the amount of electric power generation decreases, and hence the rotational speed Nc of the compressor increases. As the rotational speed Nc of the compressor increases, the supercharged pressure PC increases, and hence the intake air amount Gcyl increases. In the second regeneration mode, the valve timing θvlv is set to a regular timing (typically, the time point when the intake stroke is completed).

When the opening angle of the accelerator pedal is AP2, the motor command is set to zero. As described above, the motor/generator 24 stops and the compressor 6 is rotated by the driving force of the engine. The rotational speed Nc of the compressor is the same as the engine rotational speed NE.

In an assist mode, the requested engine power exceeds AP2. In this mode, the rotational speed Nc of the compressor is set to be higher than the engine rotational speed NE. In the assist mode, a motor command is generated so that the compressor rotational speed Nc corresponding to a desired supercharged pressure Pc is achieved. This motor command has a positive value so that the motor/generator 24 is actuated as an electric motor 24. As the absolute value of the motor command increases, the rotational speed Nc of the compressor increases. As the rotational speed Nc of the compressor increases, the supercharged pressure Pc increases, and hence the intake air amount Gcyl increases.

Alternatively, any other valve-timing mechanisms may be used instead of the above variable valve-timing mechanism.

Figure 5:
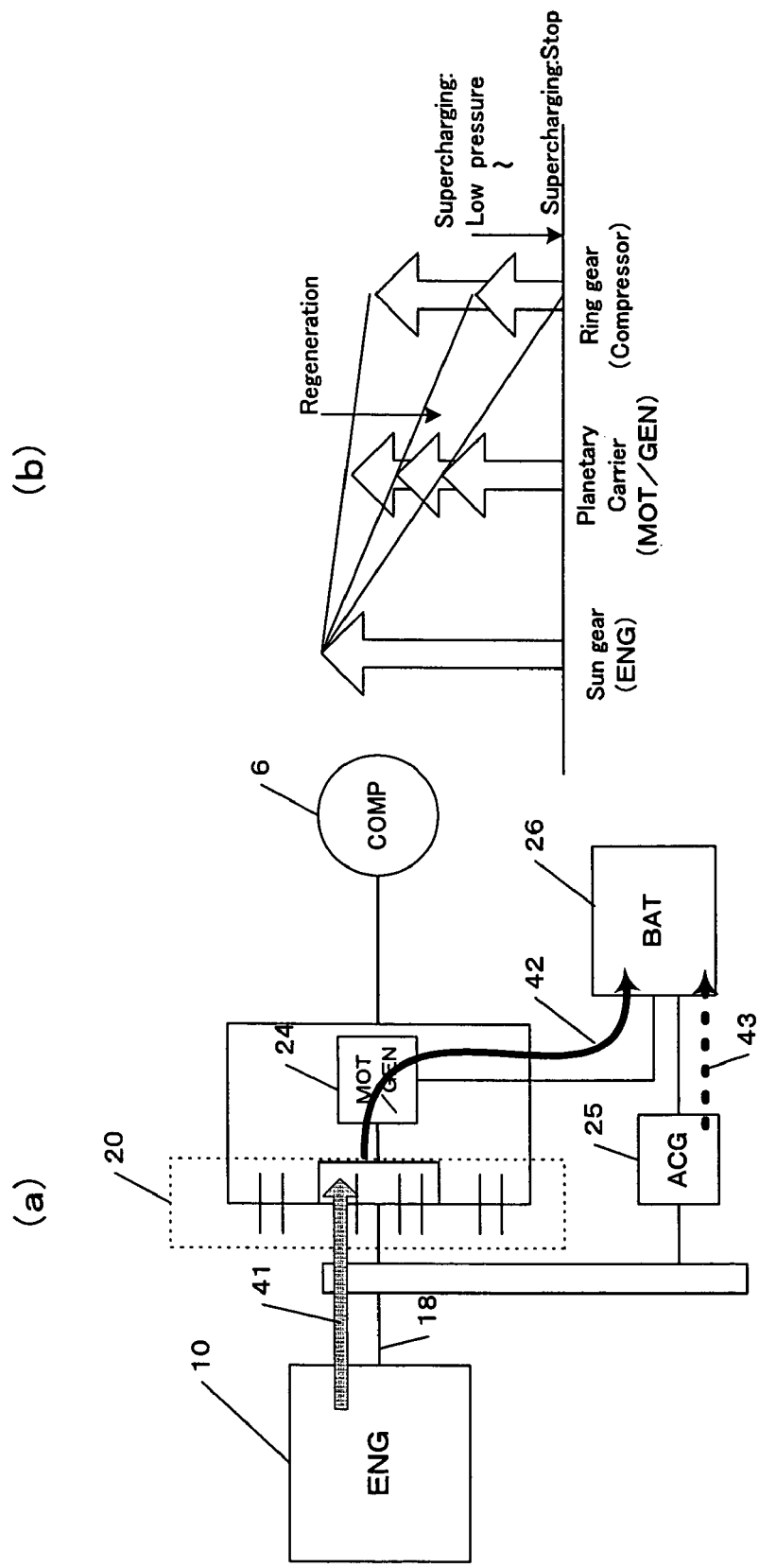
FIG. 5 shows a flow of the energy and a rotational speed of each gear of the planetary gear mechanism in a regeneration mode in accordance with one embodiment of the present invention.

FIG. 5(a) shows a flow of the energy in the first and second regeneration modes, which may be simply referred to as a "regeneration mode" hereinafter. FIG. 5(b) relatively shows the rotational speed of each gear of the planetary gear mechanism 20 in the regeneration mode. An arrow 41 shows the driving force of the engine. The regeneration mode is performed when the engine load is low (for example, when an opening angle AP of the accelerator pedal is small).

The motor/generator 24 is actuated as an electric generator by the driving force 41 of the engine. Electric energy from the motor/generator 24 is regenerated to charge the battery 26 as indicated by an arrow 42.

When the electric energy generated by the motor/generator 24 is greater than the rotational energy generated by the driving force 41 of the engine, the rotational speed of the carrier 28 decreases relative to the engine rotational speed NE (that is, the rotational speed of the sun gear 21). As the amount of electric power generation of the motor/generator 24 increases, the rotational speed of the carrier 28 decreases. As the rotational speed of the carrier 28 decreases, the rotational speed of the ring gear 23 decreases. As the rotational speed of the ring gear 23 decreases, the rotational speed of the compressor 6 decreases. Thus, a lower supercharged pressure is generated. By adjusting the amount of electric power generation from the motor generator 24, the rotation of the compressor 6 can be stopped. The stop of the rotation of the compressor 6 stops supercharging.

As indicated by an arrow 43, electric power from the electric generator 25, which is mounted on the vehicle, charges the battery 26. However, such charge from the electric generator 25 to the battery 26 can be removed by regenerating the electric energy from the motor/generator 24 into the battery 26.

Thus, when the engine load is low, the motor/generator 24 is actuated as an electric generator to feed the regenerative energy to the battery 26. A loss of the engine output is reduced because excessive supercharging is prevented. Energy efficiency is improved because the regenerative energy that charges the battery 26 can be used for any other electronic equipment.

Figure 6:
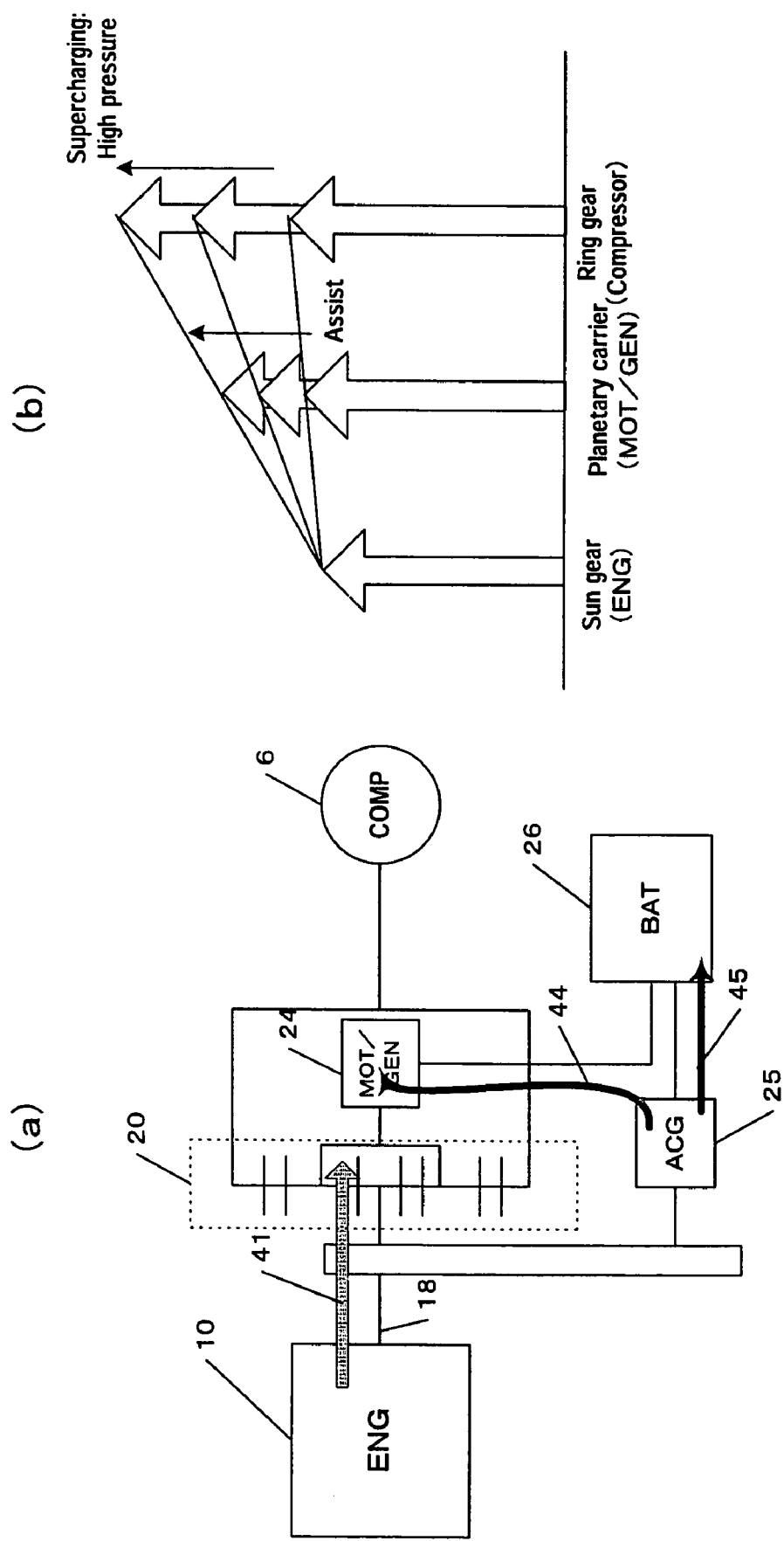
FIG. 6 shows a flow of the energy and a rotational speed of each gear of the planetary gear mechanism in an assist mode in accordance with one embodiment of the present invention.

FIG. 6(a) shows a flow of the energy in the assist mode. FIG. 6(b) relatively shows the rotational speed of each gear of the planetary gear mechanism 20 in the assist mode. An arrow 41 shows the driving force of the engine. The embodiment shown in FIG. 6 is implemented, for example, when the engine load is high although the engine rotational speed NE is low.

As indicated by an arrow 44, the motor/generator 24 is supplied with electric power from the electric generator 25 to act as an electric motor. The rotational speed of the carrier 28 can be made higher than the engine rotational speed NE (that is, the rotational speed of the sun gear 21) by controlling the amount of the electric power supply to the motor/generator 24. As the amount of the electric power supply to the motor/generator 24 increases, the rotational speed of the carrier 28 increases. As the rotational speed of the carrier 28 increases, the rotational speed of the ring gear 23 increases. As the rotational speed of the ring gear 23 increases, the rotational speed of the compressor 6 increases, and hence a high supercharged pressure is generated.

As indicated by an arrow 45, the electric power from the electric generator 25 charges the battery 26.

Thus, when the engine load is high, the motor/generator 24 is actuated as an electric motor so that a high supercharged pressure is generated. A shortage of the supercharged pressure is prevented even when the engine rotational speed is low.

When the engine rotational speed is high, the volume of air introduced into the cylinder needs to be increased. In order to increase the volume of air by the supercharging process, the rotational speed Nc of the compressor needs to be increased. In such a case, the motor/generator 24 may be configured to receive electric power supply from both of the electric generator 25 and the battery 26. Thus, a large amount of air with a high pressure may be generated in the supercharging process by increasing the amount of electric power supplied to the motor/generator 24.

Figure 7:
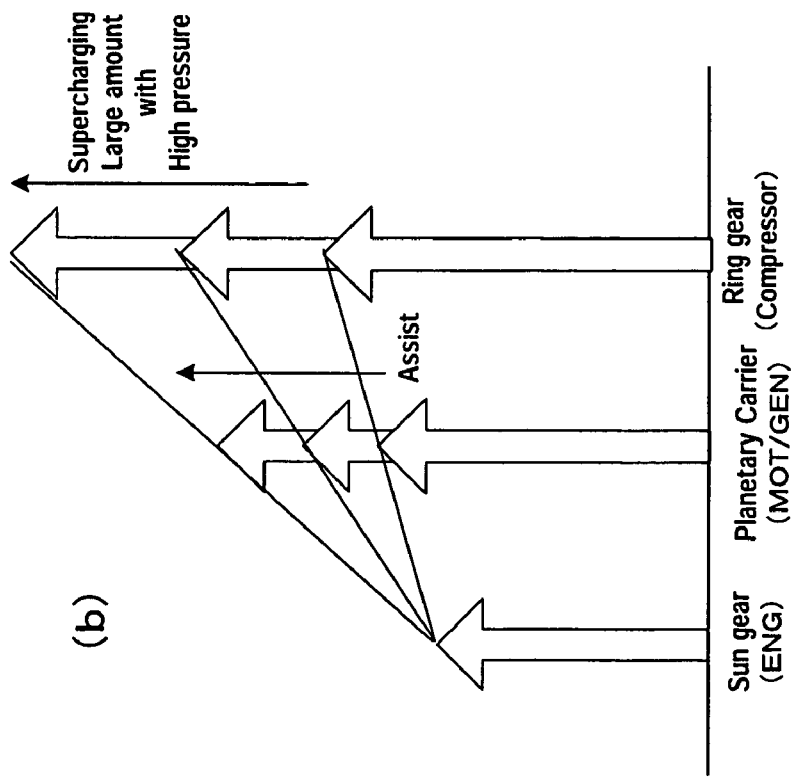
FIG. 7 shows a flow of the energy and a rotational speed of each gear of the planetary gear mechanism when supercharging is maximized in an assist mode in accordance with one embodiment of the present invention.
Figure 7:
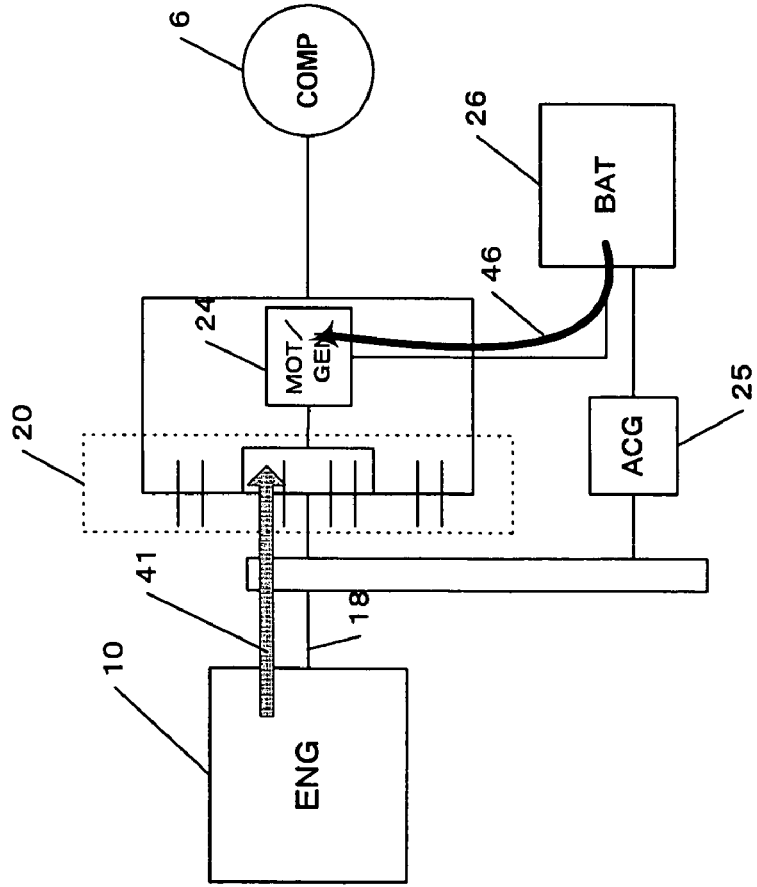

FIG. 7(a) shows a flow of the energy when the engine load is significantly high in the assist mode. FIG. 7(b) relatively shows the rotational speed of each gear of the planetary gear mechanism 20 when the engine load is significantly high in the assist mode. This embodiment is implemented, for example, when an opening angle of the accelerator pedal is full open or almost full open.

In order to generate a large amount of air with a high pressure, the rotational speed Nc of the compressor needs to be increased. The operation of the electric generator 25 is stopped so that a loss of the engine output required for operating the generator 25 is removed. As indicated by an arrow 46, electric power is supplied to the motor/generator 24 only from the battery 26. The effect of supercharging can be maximized because no engine output is consumed in the electric generator 25. This embodiment would be effective, for example, when the effect of the compressor is temporarily maximized.

In another embodiment, a battery such as a Ni-MH (nickel-hydrogen) battery or a lithium-ion battery may be used as a mass energy storage means. Through the use of such a battery, a state can be prevented where electric energy from the motor/generator is not regenerated in the regeneration mode because the battery capacity is large. Electric power required for generating a desired supercharged pressure can be received from the battery in the assist mode. With such a battery, the electric generator 25 may be removed.

Control Flow

Figure 8:
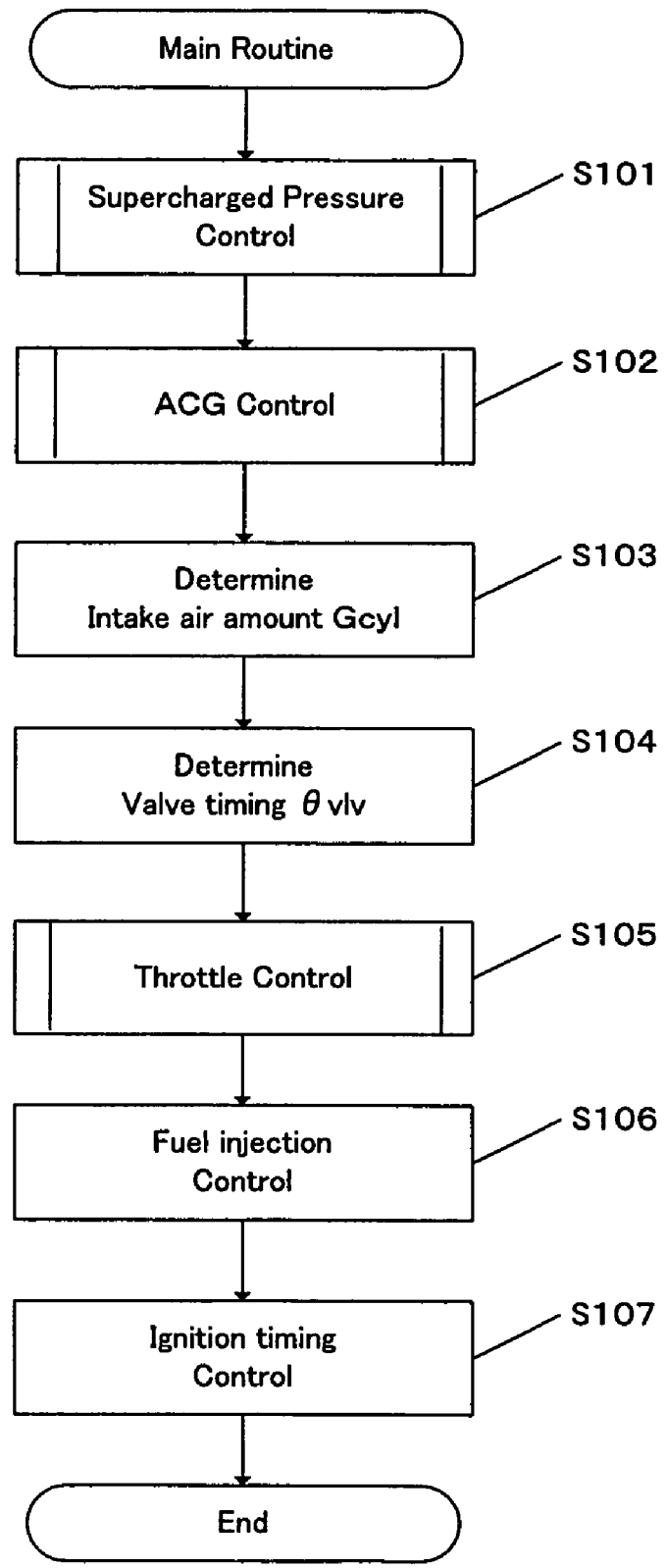
FIG. 8 shows a flowchart of a main routine for engine control in accordance with one embodiment of the present invention.

FIG. 8 shows a main routine of an engine control in accordance with one embodiment of the present invention. This routine is typically implemented by programs stored in the memory 1c of the ECU 1. This routine is performed repeatedly at a predetermined time interval.

In step S101, a supercharged pressure control routine (FIG. 9) is performed to determine a motor command for driving the motor/generator 24. In step S102, an ACG control routine (FIG. 10) is performed to generate a control signal that is to be sent to the electric generator 25. The electric generator 25 is switched between ON and OFF in accordance with the generated control signal.

In step 103, the amount of intake air Gcyl introduced into the cylinder is calculated in accordance with the equation (1). In the equation (1), Gth represents an output of the airflow meter 4 (FIG. 1). Pb represents an output of the intake manifold pressure sensor 14 (FIG. 1). Vb represents a volume (m³) of the intake air manifold. Tb represents a temperature (K) of the intake air manifold. R represents the gas constant.

$$Gcyl(k) = Gth(k) - \frac{(Pb(k) - Pb(k-1)) \cdot Vb}{Tb \cdot R} \quad (1)$$

Figure 12:
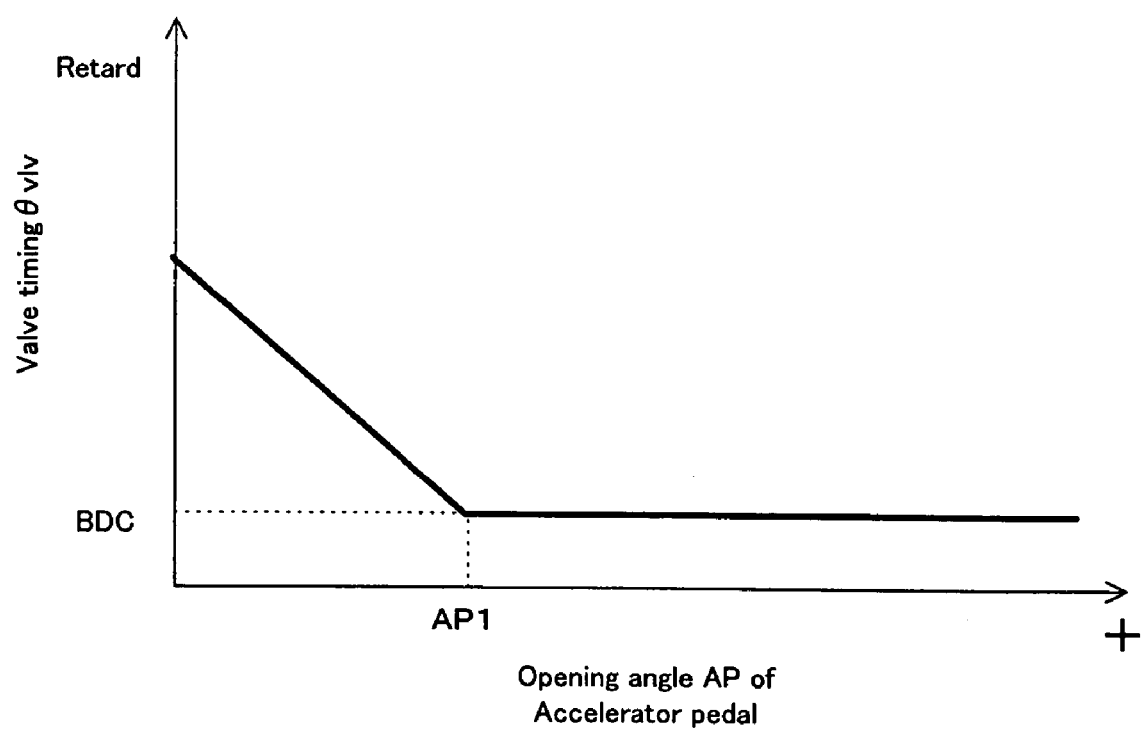
FIG. 12 is a table showing a valve timing corresponding to an opening angle of an accelerator pedal in accordance with one embodiment of the present invention.

In step S104, a valve timing θvlv for closing the intake valve is determined. This determination may be performed by referring to a map, which is pre-stored in the memory, based on the detected opening angle AP of the accelerator pedal. An example of such a map is shown in FIG. 12. The opening angle AP1 of the accelerator pedal, which is the same as shown in FIG. 4, indicates an opening angle of the accelerator pedal at which the mode is switched from the first regeneration mode to the second regeneration mode. When the opening angle of the accelerator pedal is equal to or less than AP1, the amount of intake air is controlled by the valve timing θvlv.

In step S105, a throttle control routine (FIG. 11) is performed to determine an opening angle TH of the throttle valve. In step S106, a fuel injection control is performed to determine a fuel injection time. In step S107, an ignition timing control is performed to determine an ignition timing based on the determined fuel injection time. Since the fuel injection control and the ignition timing control can be performed in accordance with any conventional appropriate control scheme, the detailed description is omitted.

Figure 9:
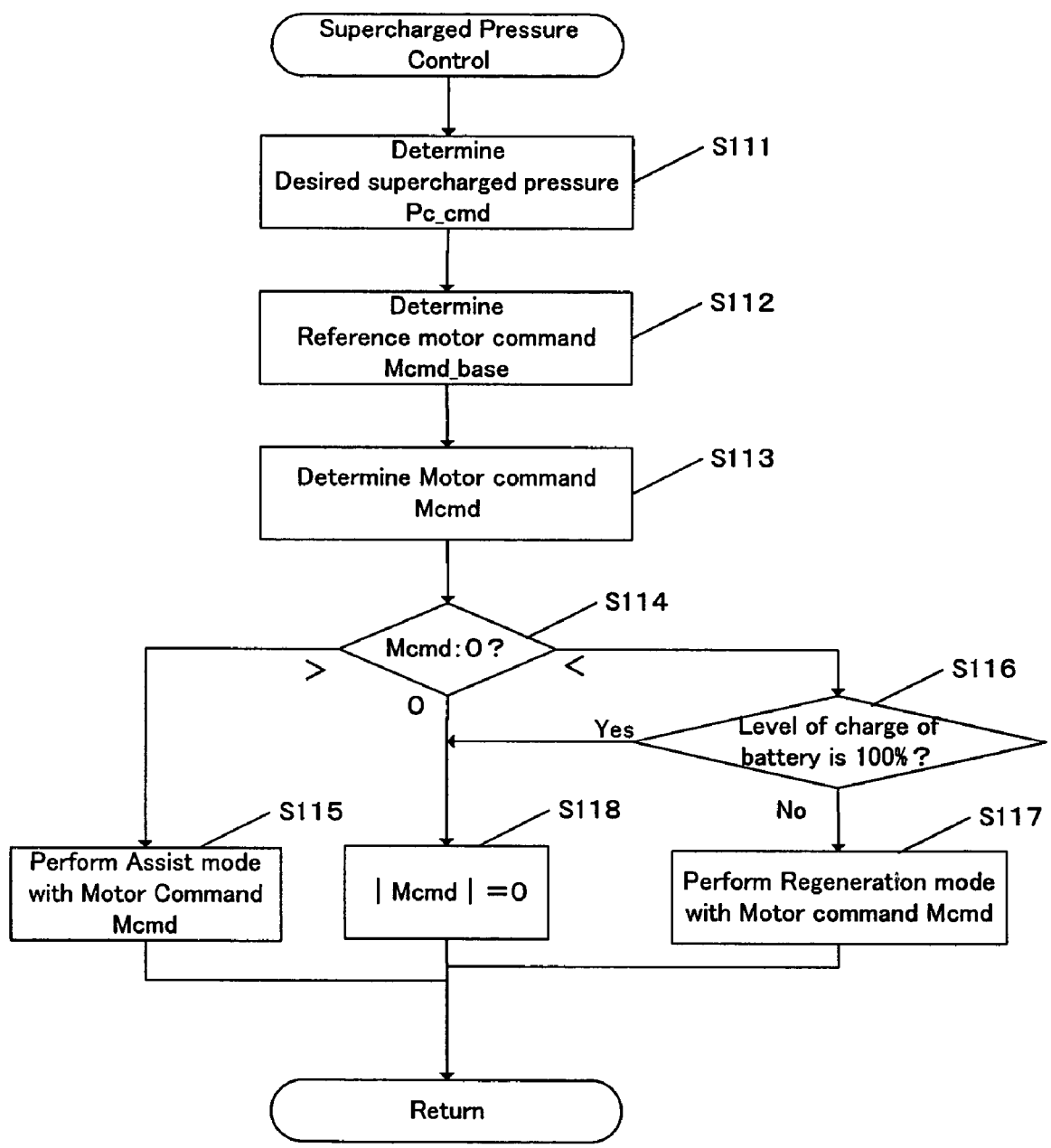
FIG. 9 shows a flowchart of a supercharged pressure control in accordance with one embodiment of the present invention.

FIG. 9 shows a supercharged pressure control routine. In step S111, the process refers to a map based on the opening angle AP of the accelerator pedal detected by the accelerator pedal opening sensor 27 (FIG. 1) and the engine rotational speed NE detected by the engine rotational speed sensor 17 (FIG. 1), to determine a desired supercharged pressure Pc_cmd.

Figure 13:
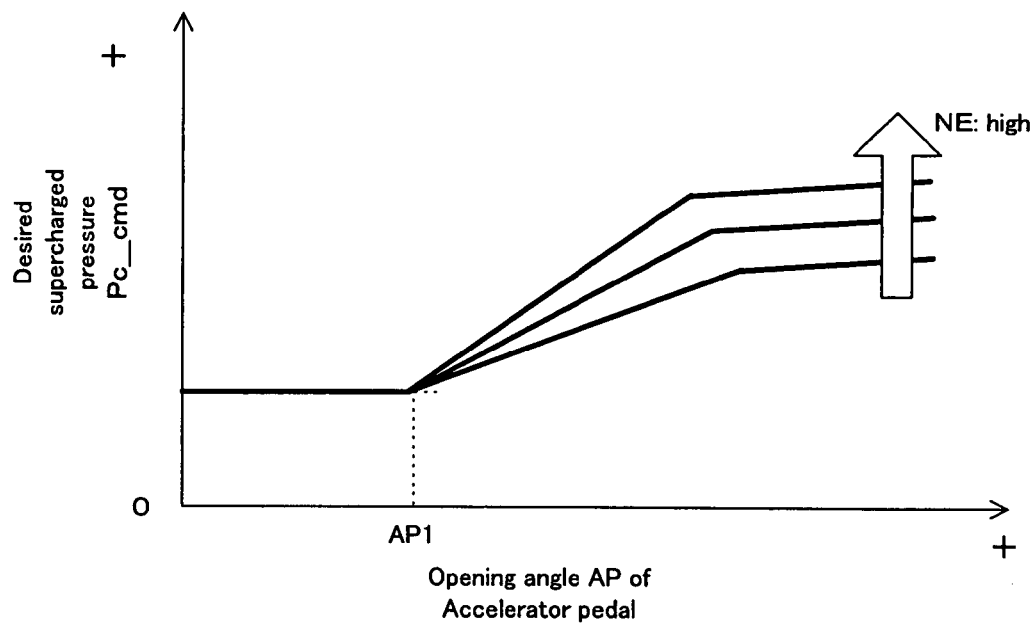
FIG. 13 is a table showing a desired supercharged pressure corresponding to an opening angle of an accelerator pedal in accordance with one embodiment of the present invention.

An example of such a map is shown in FIG. 13. The opening angle AP1 of the accelerator pedal is equivalent to AP1 shown in FIG. 4. When the opening angle of the accelerator pedal is equal to or less than AP1, the desired supercharged pressure Pc_cmd is maintained at a predetermined value (for example, the atmospheric pressure Pa) because the supercharged pressure control is not performed. When the opening angle of the accelerator pedal exceeds AP1, the supercharged pressure control is started. As the opening angle AP of the accelerator pedal increases, the desired supercharged pressure Pc_cmd increases. As the engine rotational speed NE increases, the desired supercharged pressure Pc_cmd increases. This is because the amount of air needs to be increased as the engine rotational speed NE increases.

In step s112, the process refers to a map based on the opening angle AP of the accelerator pedal detected by the accelerator pedal opening sensor 27 and the engine rotational speed NE detected by the engine rotational speed sensor 17, to determine a reference motor command Mcmd_base.

Figure 14:
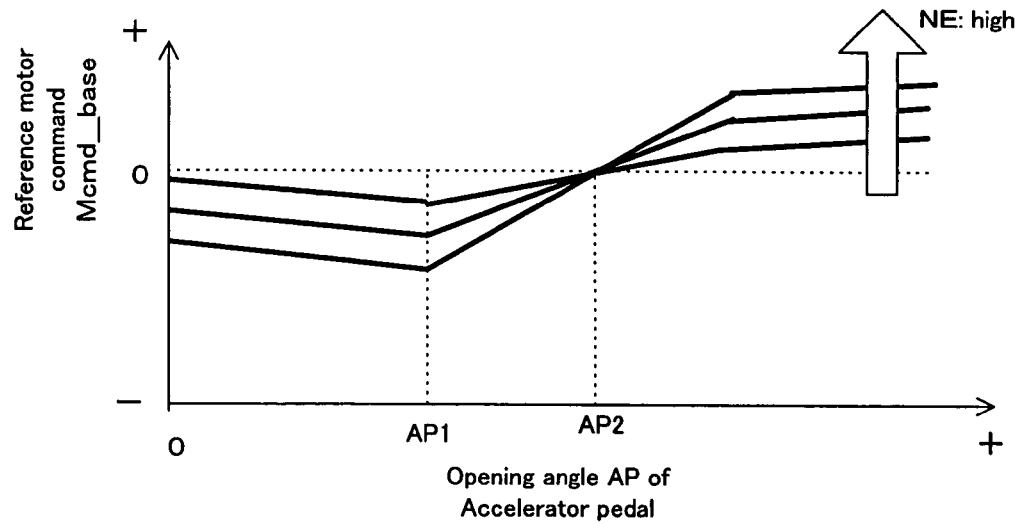
FIG. 14 is a table showing a reference motor command corresponding to an opening angle of an accelerator pedal in accordance with one embodiment of the present invention.

An example of such a map is shown in FIG. 14. The opening angles AP1 and AP2 of the accelerator pedal are equivalent to AP1 and AP2 shown in FIG. 4, respectively. AP1 indicates the opening angle of the accelerator pedal at which the mode is switched from the first regeneration mode to the second regeneration mode. AP2 indicates the opening angle of the accelerator pedal at which the mode is switched from the second regeneration mode to the assist mode. When the opening angle of the accelerator pedal is within a range from zero to AP2, the reference motor command Mcmd_base is set to a negative value, so that the motor/generator 24 is actuated as an electric generator. As the absolute value of the reference motor command increases, the amount of electric power generation increases, and hence a force braking the rotation of the compressor 6 increases. As the force braking the rotation of the compressor 6 increases, the rotational speed of the compressor 6 decreases.

If the opening angle of the accelerator pedal is greater than AP2, the reference motor command Mcmd_base is set to a positive value, so that the motor/generator 24 is actuated as an electric motor. As the absolute value of the reference motor command increases, the amount of electric power supply to the motor/generator 24 increases, and hence the rotational speed of the compressor 6 increases.

In step S113, a response assignment control is performed to determine a motor command Mcmd(k) that is to be applied to the motor/generator 24 in the current cycle in accordance with the equation (2). The response assignment control enables the supercharged pressure PC to converge to the desired supercharged pressure Pc_cmd without overshooting. In the following equations, k indicates an identifier for identifying a control cycle.

$$Mcmd(k) = Mcmd\_base(k) - Krch \cdot \sigma(k) - Kadp \sum_{i=0}^{k} \sigma(i) \quad (2)$$

$$\sigma(k) = e(k) + POLE \cdot e(k-1) \quad (3)$$

$$e(k) = Pc(k) - Pc\_cmd(k) \quad (4)$$

The response assignment control is a control that specifies a convergence speed of a controlled variable (in this example, an error "e" between the supercharged pressure Pc and its desired value Pc_cmd) to the desired value (in this example, zero).

The response assignment control causes the supercharged pressure Pc to converge to the desired value Pc_cmd by causing the controlled variable "e" to converge to zero.

In the response assignment control, a switching function σ is established. POLE is a setting parameter of the switching function σ. The setting parameter POLE specifies a convergence speed of the error e. The setting parameter POLE is preferably set to satisfy −1<POLE<0.

A system where σ(k)=0 is called an equivalent input system, which specifies convergence characteristics of the error e. When σ(k)=0, the switching function a of the equation (3) is expressed by the equation (5).

$$e(k) = -POLE \cdot e(k-1) \tag{5}$$

Figure 15:
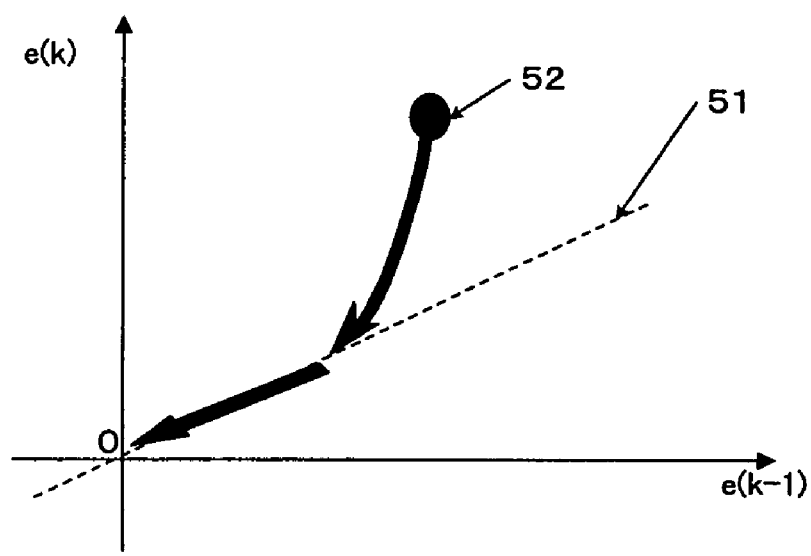
FIG. 15 shows a switching function in a response assignment control in accordance with one embodiment of the present invention.

The switching function will be now described referring to FIG. 15. On a phase plane with e(k) being the vertical axis and e(k−1) being the horizontal axis, a switching function σ of the equation (5) is shown by the line 51. This line 51 is referred to as a switching line. It is assumed that a point 52 is an initial value of a state variable (e(k−1), e(k)). The response assignment control acts to place the state variable 52 onto the switching line 51 and then confines it on the switching line 51.

According to the response assignment control, the state variable can highly stably converge to the origin 0 on the phase plane without being affected by disturbances. In other words, by confining the state variable (e(k−1), e(k)) on such a stable system having no input as shown by the equation (5), the supercharged pressure Pc can converge to the desired supercharged pressure Pc_cmd robustly against disturbances and modeling errors.

Since the phase plane regarding the switching function σ has two dimensions in this embodiment, the switching line is represented by a straight line 51. When the phase plane has three dimensions, the switching line is represented by a plane. When the phase plane has four or more dimensions, the switching line is represented by a hyperplane.

The setting parameter POLE can be variably set. The convergence (attenuation) characteristics of the error e can be specified by adjusting the setting parameter POLE.

Figure 16:
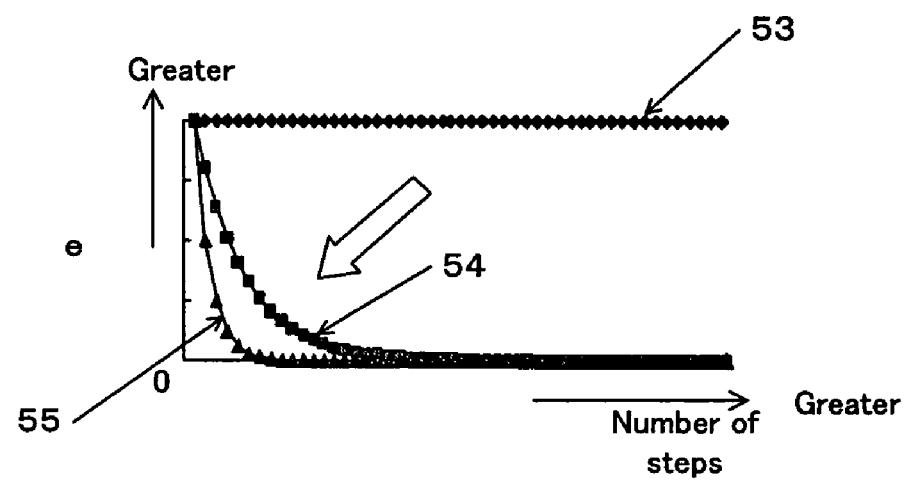
FIG. 16 shows a convergence speed corresponding to a value of a setting parameter of a switching function in accordance with one embodiment of the present invention.

FIG. 16 shows an example of response assignment characteristics according to the response assignment control. Graphs 53, 54 and 55 show a convergence speed in cases of POLE=−1, −0.8 and −0.5, respectively. As the absolute value of the setting parameter POLE becomes smaller, the convergence speed of the error e becomes faster.

The second term of the equation (2) (a proportional term of the switching function σ) represents a reaching law input that acts to place the state variable on the switching line. The third term (an integral term of the switching function σ) represents an adaptive law input that acts to place the state variable on the switching line while suppressing modeling errors and disturbances. Krch and Kadp represent feedback gains, which can be determined, for example, through a simulation.

Thus, the motor command Mcmd is determined so that the supercharged pressure Pc converges to the desired value Pc_cmd at a specified convergence speed.

Referring back to FIG. 9, the determined motor command Mcmd is compared with zero in step S114. If the motor command Mcmd is greater than zero, the amount of electric power indicated by the motor command Mcmd is supplied to the motor/generator 24 to actuate the motor/generator 24 as an electric motor. If the motor command Mcmd is less than zero, it is determined whether the level of charge of the battery 26 is 100% (S116). If the level of charge of the battery is not 100%, electric energy from the motor/generator 24 can be regenerated to charge the battery 26. Accordingly, the motor/generator 24 is actuated as an electric generator to generate the amount of electric power indicated by the motor command Mcmd (S117).

When the motor command Mcmd is zero in step S114, the motor command Mcmd having zero is supplied to the motor/generator 24 (S118).

If the level of charge of the battery is 100% in step S116, the motor command Mcmd is set to zero (S118) because electric energy from the motor/generator 24 cannot be regenerated to charge the battery 26. If the motor command Mcmd is zero, the compressor 6 is rotated by the driving force of the engine as described above referring to FIG. 3. Because the operation of the motor/generator 24 has stopped, an uncontrolled supercharging process is performed. In such a condition, the amount of intake air to the engine is adjusted by a throttle control, which will be described later referring to FIG. 11.

Alternatively, the response assignment control in step S113 may not be performed. In such a case, the reference motor command determined from the map in step S112 may be used as a motor command for driving the motor/generator 24.

Figure 10:
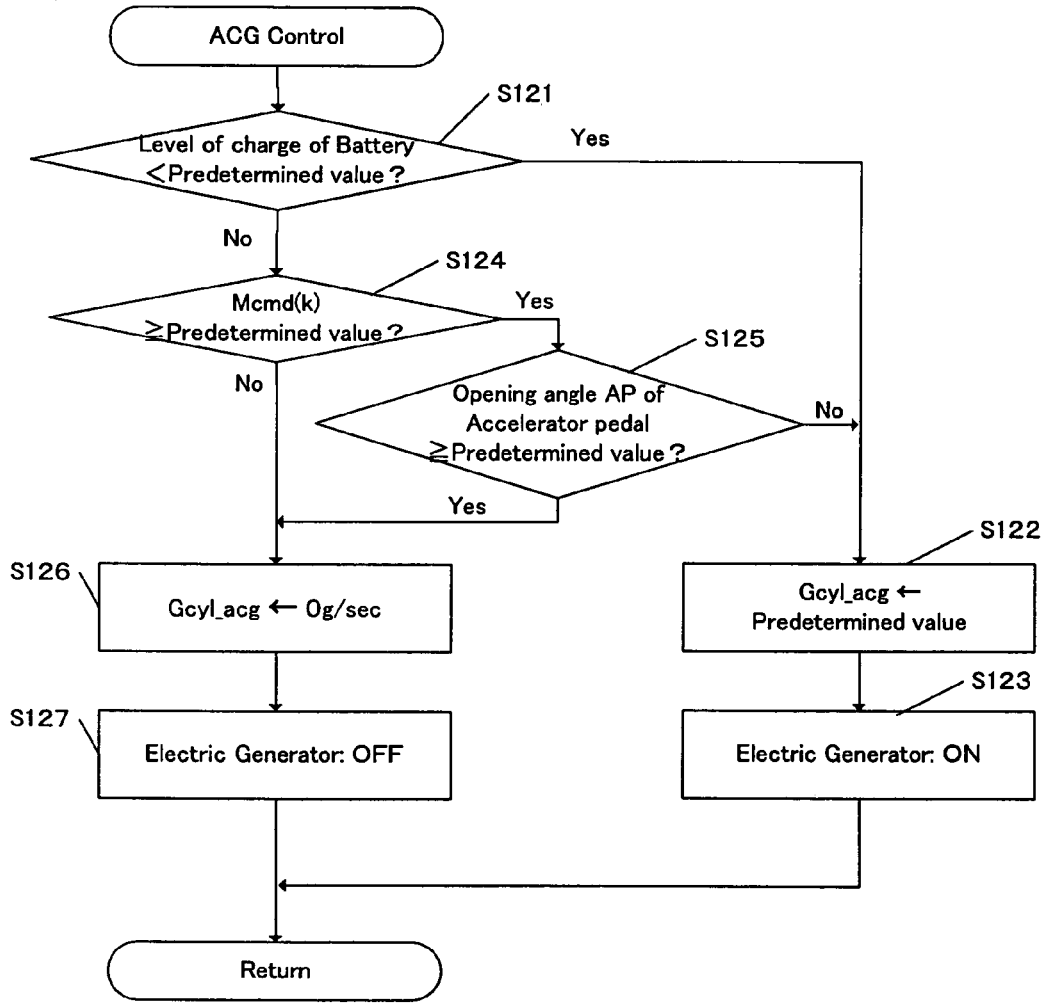
FIG. 10 shows a flowchart of an electric generator (ACG) control in accordance with one embodiment of the present invention.

FIG. 10 shows an ACG control routine. In step S121, it is determined whether the level of charge of the battery 26 is less than a predetermined value (for example, 30%). If the answer of step S121 is Yes, it indicates that the level of charge of the battery 26 is insufficient. In such a case, the process proceeds to step S122, in which a predetermined value (for example, 2 g/sec) is set in an increment Gcyl_acg for the amount of intake air so as to generate an engine output required for operating the electric generator 25. In step S123, the electric generator 25 is actuated. Thus, when the level of charge of the battery 26 is insufficient, the electric generator 25 is actuated so that electric power from the electric generator 25 charges the battery 26. The electric generator 25 is driven by the engine output. In order to compensate for the engine output used for the electric generator 25, the amount of intake air to the engine is increased by Gcyl_acg.

If the level of charge of the battery 26 is sufficient in step S121, the process proceeds to step S124. In step S124, the motor command Mcmd is compared with a predetermined value (for example, 1 kw) to examine the amount of electric power that is to be supplied to the motor/generator 24 (that is, the amount of assisting). If the electric power that is to be supplied to the motor/generator 24 is less than the predetermined value, the motor/generator 24 can be driven by electric power from the battery 26. The process proceeds to step S126, in which the increment Gcyl_acg for the amount of intake air is set to zero to stop the electric generator 25 (S127).

If the electric power that is to be supplied to the motor/generator 24 is equal to or more than the predetermined value in step S124, the opening angle AP of the accelerator pedal is examined (S125). If the opening angle AP of the accelerator pedal is less than a predetermined value (which is corresponding to full open position or almost full open position, for example, 80%), it indicates a state in which engine output requested by the driver is not so great (that is, the engine load is not so high). Such a state corresponds to FIG. 6. The electric generator 25 is used for driving the motor/generator 24. A predetermined value (for example, 2 g/sec) is set in the increment Gcyl_acg for the amount of intake air so as to compensate for the engine output required for operating the electric generator 25 (S122). In step S123, the electric generator 25 is actuated.

If the opening angle AP of the accelerator pedal is equal to or more than the predetermined value in step S125, it indicates that engine output requested by the driver is large (that is, the engine load is significantly high). Such a state corresponds to FIG. 7. In order to maximize the driving force of the motor/generator 24, it is prevented that the engine output is consumed in the electric generator 25. The increment Gcyl_acg is set to zero (S126) to stop the electric generator 25 (S127). The motor/generator 24 is driven only by electric power from the battery 26.

If the routine is re-entered after the level of charge of the battery 26 has become less than a predetermined value (for example, 30%) due to the electric power supply to the motor/generator 24, the answer of step S121 is Yes. The electric generator 25 is actuated to start charging the battery 26 as shown in steps S122 and S123.

As described above, when the motor command has a negative value, the amount of electric power that corresponds to the motor command is generated, which is delivered as electric energy to the battery 26. By adding the energy required for operating the electric generator to the motor command, the amount of electric power generation of the motor/generator 24 can be increased. For example, if the motor command is "−α" and the energy required for operating the electric generator 25 is 3 kw, then the motor command is set to "−α−3". Thus, the energy required for operating the electric generator 25 can be generated through the electric power generation of the motor/generator 24.

In a case where some failure occurs in the electric generator 25, the motor command may be adjusted so that the motor/generator 24 generates the electric power required for operating some other electric equipment.

Figure 11:
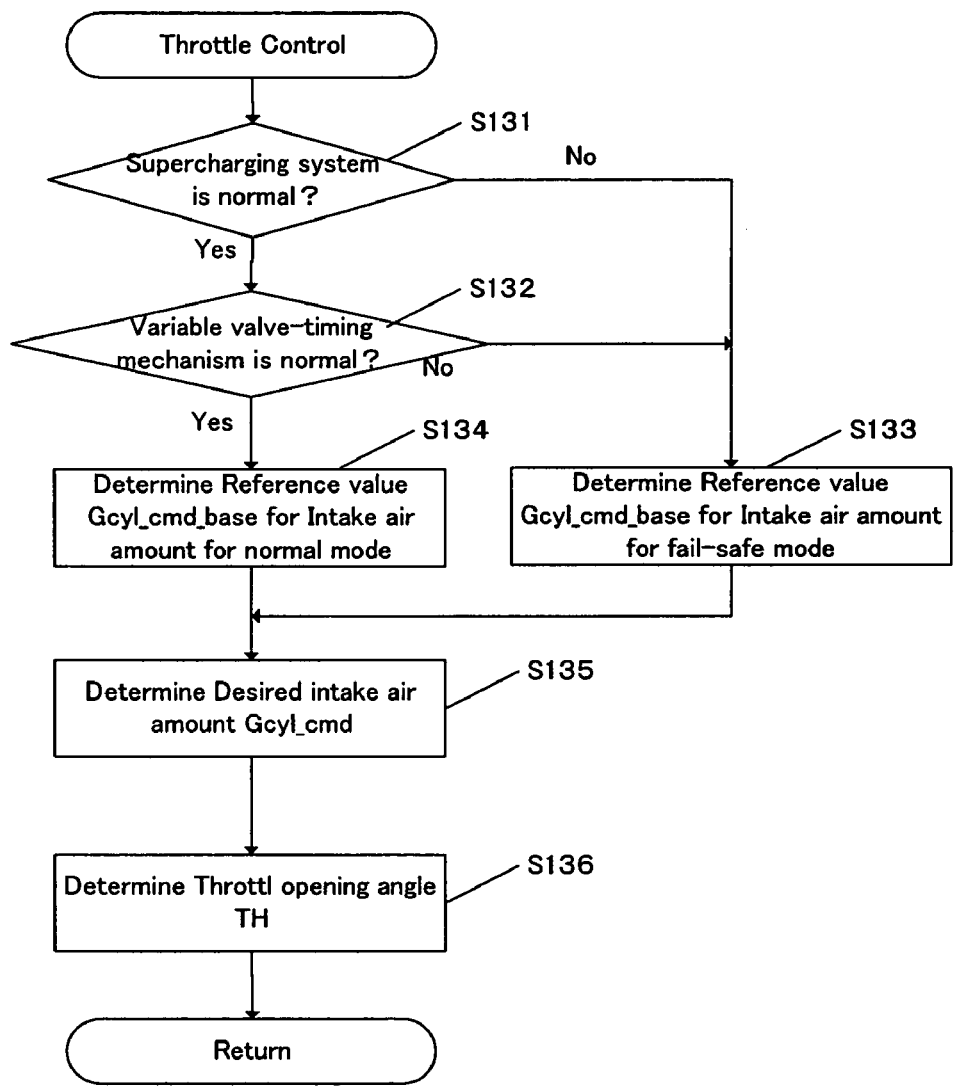
FIG. 11 shows a flowchart of a throttle control in accordance with one embodiment of the present invention.

FIG. 11 shows a throttle control routine. In step S131, it is determined whether the supercharging system is normal. The supercharging system is indicated by a reference number 30 in FIG. 1. The supercharging system may additionally include the control unit 1 for controlling the motor/generator 24. Any appropriate failure detection means may be used to determine whether the supercharging system is normal.

In step S132, it is determined whether the variable valve-timing mechanism is normal. Any appropriate failure detection means may be used to determine whether the variable valve-timing mechanism is normal.

Figure 17:
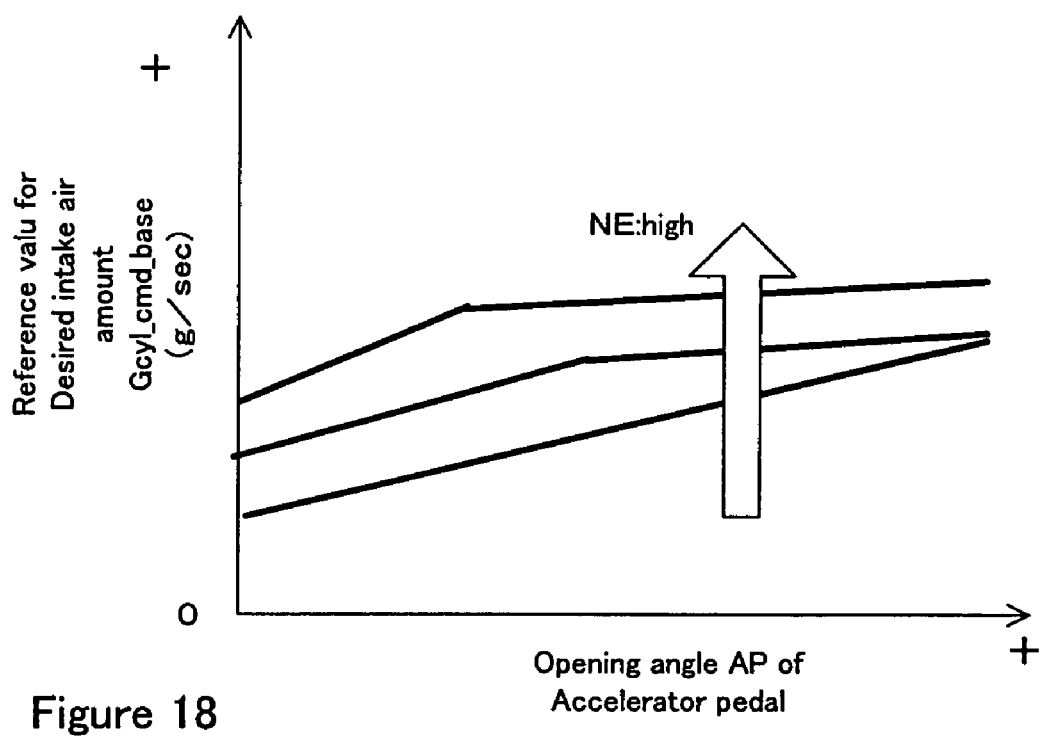
FIG. 17 is a table for a fail-safe showing a reference value for the amount of intake air corresponding to an opening angle of an accelerator pedal mode in accordance with one embodiment of the present invention.

If no failure occurs both in the supercharging system and in the variable valve-timing mechanism, the process refers to a map prepared for a fail-safe mode to determine a reference value Gcyl_cmd_base for a desired intake air amount. The reference value Gcyl_cmd_base for the desired intake air amount is determined based on the engine rotational speed NE detected by the rotational speed sensor 17 and the opening angle AP of the accelerator pedal detected by the accelerator pedal opening sensor 27 (S133). FIG. 17 shows an example of the map.

Figure 18:
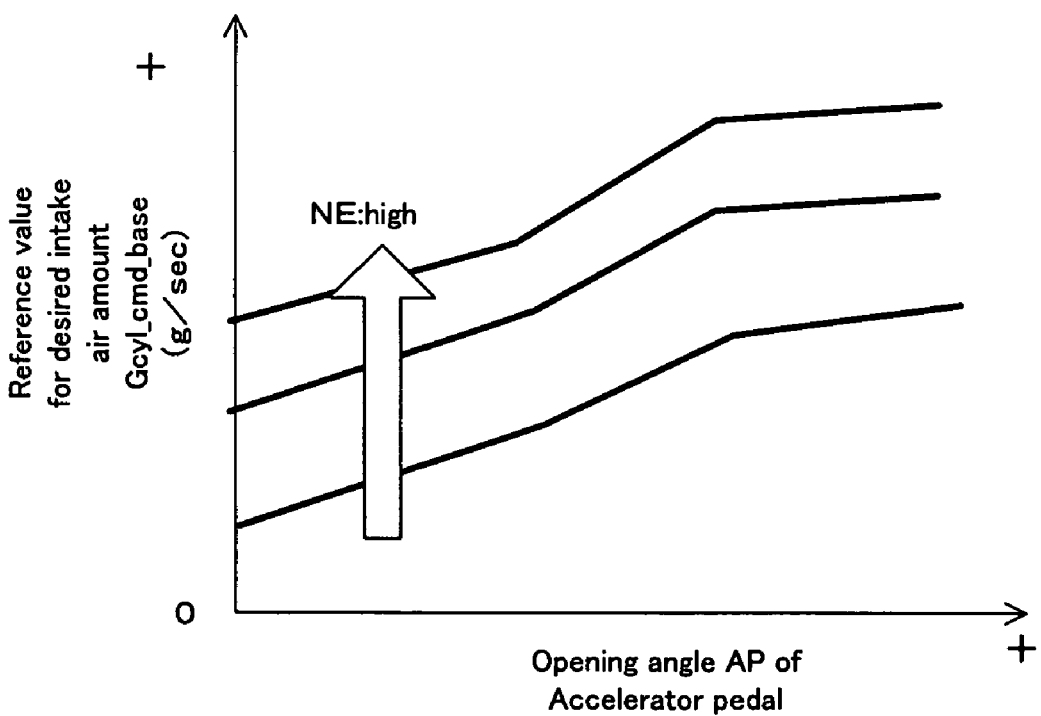
FIG. 18 is a table for a normal mode showing a reference value for the amount of intake air corresponding to an opening angle of an accelerator pedal in accordance with one embodiment of the present invention.

On the other hand, if both of the supercharging system and the variable valve-timing mechanism are normal, a map prepared for a normal mode is used to determine the reference value Gcyl_cmd_base for the desired intake air amount (S134). FIG. 18 shows an example of the map.

As seen from comparison between the map for a fail-safe mode and the map for a normal mode, the reference value for the desired intake air amount in the fail-safe mode is limited by a predetermined value so that the engine output is suppressed.

In step S135, a desired intake air amount is determined in accordance with the equation (6). Gcyl_acg, which is determined in step S122 or step S126 of FIG. 10, is added so as to compensate for the engine output consumed in the electric generator.

$$Gcyl\_cmd(k)=Gcyl\_cmd\_base(k)+Gcyl\_acg \quad (6)$$

In step S136, an opening angle TH of the throttle valve 11 (FIG. 1) is determined in accordance with the equation (7). The throttle valve opening TH is determined using a response assignment control. The response assignment control has been described above referring to FIGS. 15 and 16. σ' represents a switching function and POLE' represents a setting parameter of the switching function σ'. Krch' and Kadp' represent feedback gains, which may be pre-determined through a simulation or the like. Through the response assignment control, the throttle valve opening TH is determined so that the amount Gcyl of intake air to the cylinder converges to the desired amount Gcyl_cmd of intake air (in other words, the error e' converges to zero). The response assignment control enables the amount Gcyl of intake air to converge to the desired amount of intake air without overshooting.

$$TH(k) = -Krch' \cdot \sigma'(k) - Kadp' \sum_{i=0}^{k} \sigma'(i) \quad (7)$$

$$\sigma'(k)=e'(k)+POLE' \cdot e'(k-1) \quad (8)$$

$$e'(k)=Gcyl(k)-Gcyl\_cmd(k) \quad (9)$$

As described above referring to FIG. 4, in normal times, the throttle valve opening is set to a value indicating full open position or almost full open position because the amount of air is controlled by both of the supercharged pressure control and the valve-timing control for retarding the valve-timing. The amount of retarding the valve timing is established and the supercharged pressure control is performed so that the amount Gcyl of intake air converges to the reference value Gcyl_cmd_base for the desired intake air amount.

However, when the supercharged pressure control is not performed as shown in step S118 of FIG. 9, the amount of intake air to the cylinder is adjusted by the throttle control.

Furthermore, there is a delay in the response to the desired supercharged pressure due to the air compression operation by the compressor. Such a delay may make it difficult to accurately generate the requested engine output. The throttle control enables the amount Gcyl of intake air to the engine to follow the desired intake air amount Gcyl_cmd with high accuracy. Thus, fine tuning of the amount of intake air, which may not be handled sufficiently by the supercharged pressure control, can be implemented by the throttle control.

Supercharger in Accordance with a Second Embodiment

Figure 19:
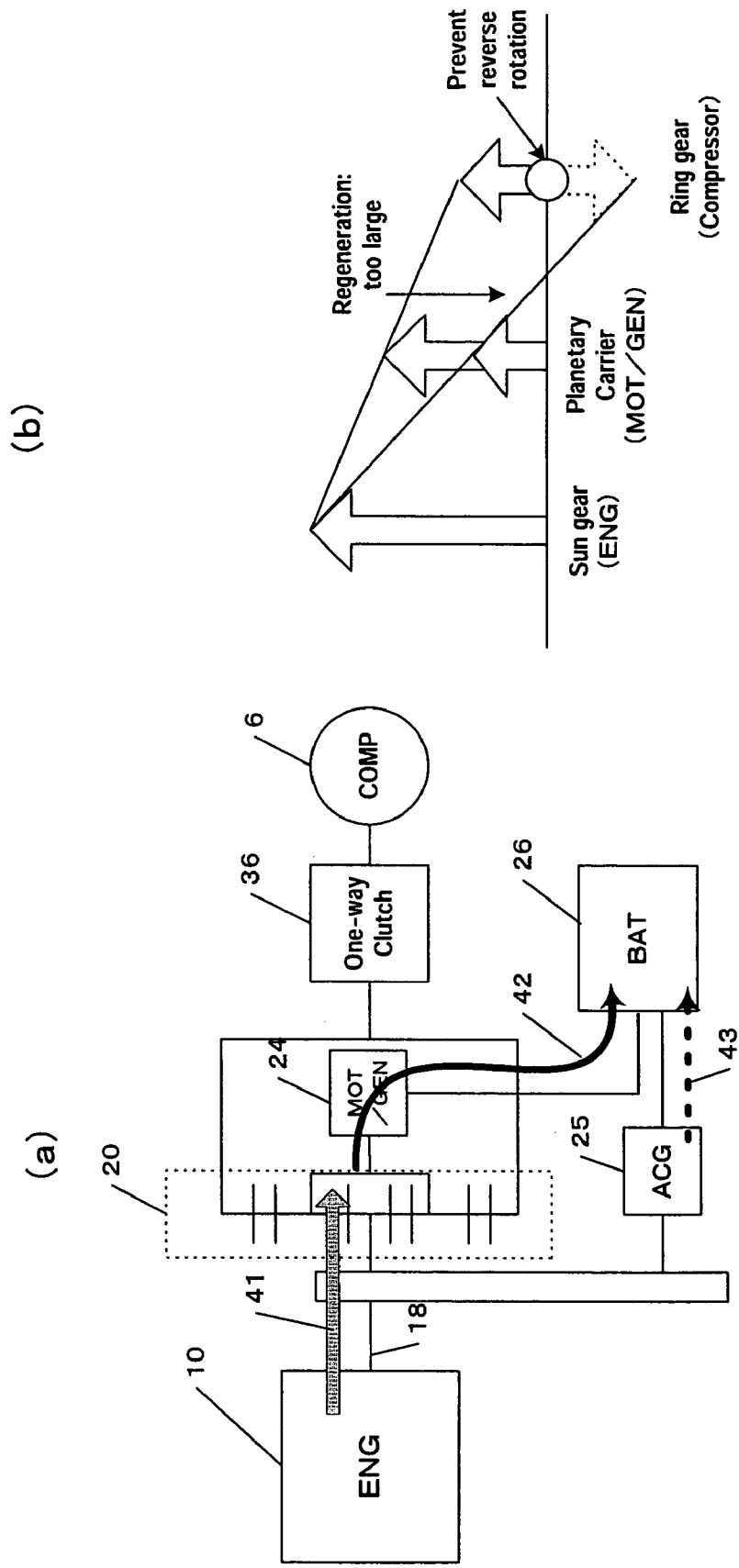
FIG. 19 shows a schematic structure of a supercharger in accordance with another embodiment of the present invention.

The supercharger in accordance with the first embodiment of the present invention has been described above. A supercharger in accordance with a second embodiment will be described. According to the second embodiment, a one-way clutch 36 is provided between the motor/generator 24 and the compressor 6. FIG. 19(a) shows a flow of the energy in the regeneration mode when the supercharger of the second embodiment is used. FIG. 19(b) relatively shows the rotational speed of each gear of the planetary gear mechanism 20 when the supercharger of the second embodiment is used. The one-way clutch 36 permits the compressor 6 to rotate in one direction, and locks the compressor not to rotate in the other direction. Thus, the one-way clutch 36 prevents reverse rotation of the compressor 6.

In the regeneration mode, as described above, as the amount of electric power generation becomes larger, a force braking the rotation of the compressor 6 becomes stronger. The compressor 6 may rotate in the reverse direction when the amount of electric power generation becomes excessive. The one-way clutch 36 can prevent such reverse rotation.

Figure 20:
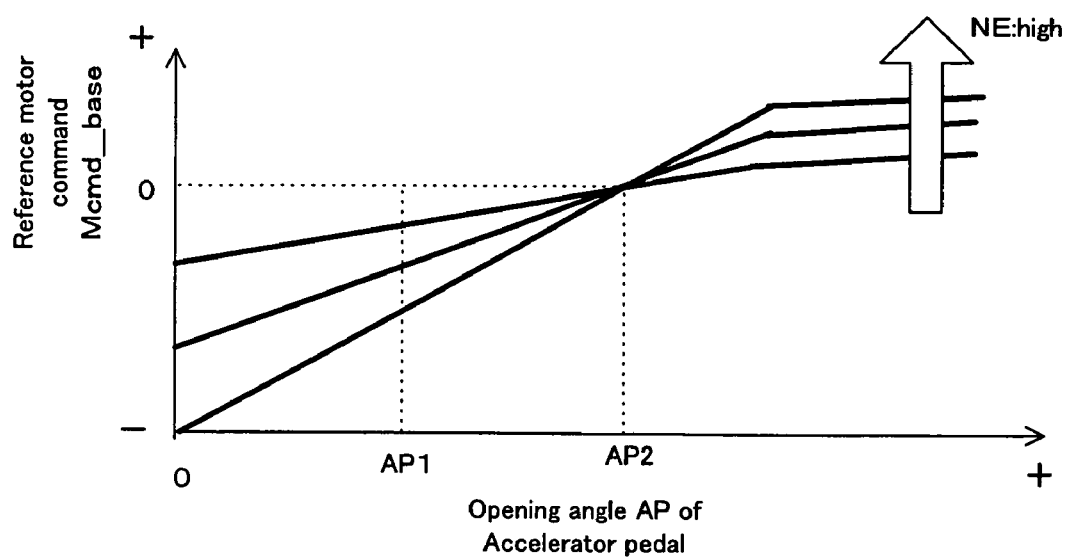
FIG. 20 is a table showing a reference motor command corresponding to an opening angle of an accelerator pedal in accordance with another embodiment of the present invention.

FIG. 20 is a map used for determining the reference motor command Mcmd_base in the second embodiment. As seen from comparison with FIG. 14, according to this map, as the opening angle AP of the accelerator pedal decreases in the first regeneration mode (in which the opening angle AP of the accelerator pedal ranges from zero to AP1), the absolute value of the reference motor command Mcmd_base increases. This is because reverse rotation of the compressor 6 can be prevented by virtue of the function of the one-way clutch 36 even if the amount of electric power generation is excessively increased.

Thus, by providing the one-way clutch 36, the amount of electric power generation can be increased while preventing reverse rotation of the compressor 6. For example, the amount of electric power generation can be increased sufficient to charge the battery 26.

As described above, it is not necessarily required to perform the response assignment control so as to determine the motor command Mcmd. However, when the response assignment control is performed for the supercharger in accordance with the first embodiment, a map as shown in FIG. 20 may be used. Even if such a map is used, the response assignment control determines the motor command Mcmd that follows values as shown in FIG. 14. That is, the response assignment control determines the motor command Mcmd so that the supercharged pressure Pc converges to the desired supercharged pressure Pc_cmd. As a result, as the opening angle of the accelerator pedal decreases in the first regeneration mode, the absolute value of the motor command Mcmd determined by the response assignment control becomes smaller, as shown in FIG. 14.

Figure 21:
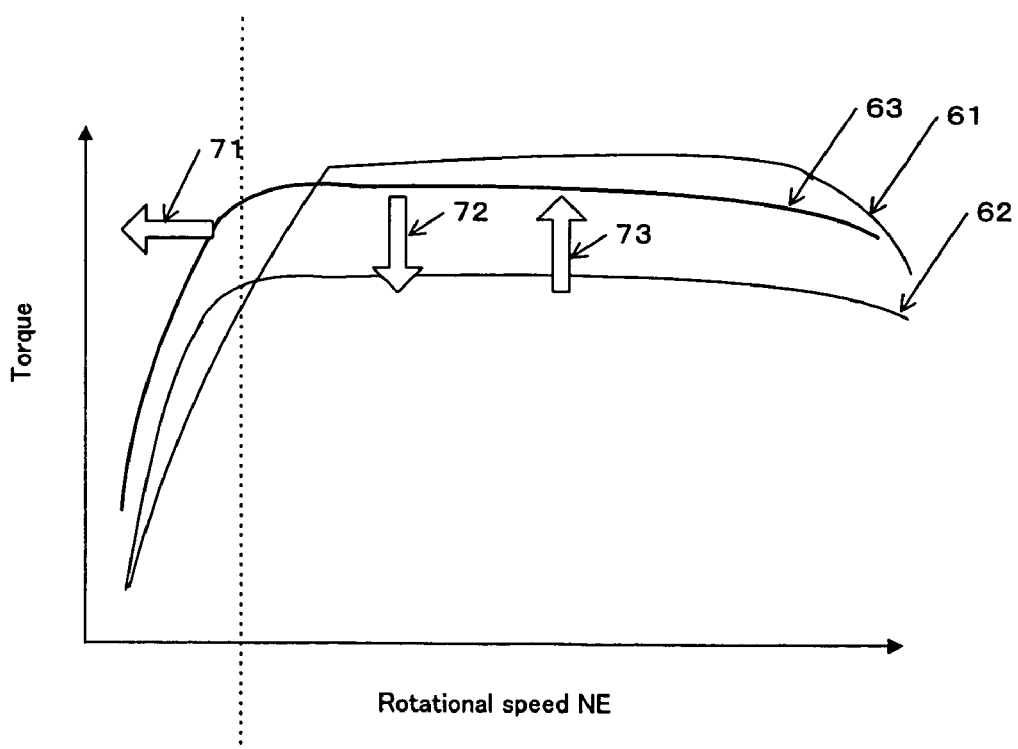
FIG. 21 shows an effect of a supercharger in accordance with one embodiment of the present invention.

FIG. 21 shows the effect of the supercharger in accordance with the present invention. This effect can be achieved in the first embodiment and the second embodiment. A reference number 61 indicates the engine torque relative to the rotational speed NE in a conventional turbocharger. A reference number 62 indicates the engine torque relative to the rotational speed NE in a conventional supercharger. A reference number 63 indicates the engine torque relative to the rotational speed NE in the supercharger in accordance with the present invention.

As described in the background of the invention section, a shortage of the supercharged pressure may occur in the conventional turbocharger when the engine rotational speed NE is low. In contrast, according to the supercharger of this invention, such a shortage in the supercharged pressure can be prevented since the rotational speed of the compressor is controlled independently of the rotational speed of the engine. Even when the engine rotational speed is low, high engine torque can be generated. It should be noted that one example is shown in FIG. 21. The motor/generator 24 can be driven to generate higher engine torque as shown by an arrow 71.

As described in the background of the invention section, according to the conventional supercharger, sufficient engine output may not be achieved due to a driving loss even when the engine rotational speed is high. Further, if a small compressor is used so as to reduce a driving loss and/or to prevent excessive supercharging when the engine rotational speed is high, sufficient effect of supercharging may not be achieved due to a decrease in the rotational speed of the compressor when the engine rotational speed is low. According to the supercharger of the present invention, any appropriate supercharged pressure can be generated over a wide range from low engine rotational speed to high engine rotational speed because the rotational speed of the compressor can be controlled independently of the engine rotational speed.

According to the present invention, as shown by an arrow 72, the supercharged pressure can be continuously decreased down to a desired level or supercharging can be stopped while regenerating the electric energy by actuating the motor/generator 24 as an electric generator. As shown by an arrow 73, the supercharged pressure can be continuously increased up to a desired level by actuating the motor/generator 24 as an electric motor. According to the supercharger of the present invention, requested engine output can be achieved at any engine rotational speed while keeping the energy efficiency high.

The invention may be applied to an engine to be used in a vessel-propelling machine such as an outboard motor in which a crankshaft is disposed in the perpendicular direction.

What is claimed is:

1. A method for controlling a supercharger of an engine, the supercharger comprising a planetary gear mechanism that includes a sun gear connected to a driving shaft of the engine, at least one planetary gear connected to a motor/generator and a ring gear connected to a compressor, the method comprising the steps of:
    driving the motor/generator to control a rotational speed of the at least one planetary gear, wherein the rotational speed of the ring gear is controlled independently of the sun gear; and
    through the control of the rotational speed of the at least one planetary gear, controlling a rotational speed of the compressor independently of a rotational speed of the engine.

2. The method of claim 1 wherein the motor/generator is connected to a carrier which defines orbital motion of the at least one planetary gear relative to the sun gear.

3. The method of claim 1 further comprising the step of:
    driving the motor/generator so that the compressor rotates at a higher rotational speed than the rotational speed of the engine when a requested driving force of the engine exceeds a predetermined value.

4. The method of claim 1 further comprising the step of:
    driving the motor/generator so that the compressor rotates at a lower rotational speed than the rotational speed of the engine or so that the rotation of the compressor stops when a requested driving force of the engine is less than a predetermined value.

5. The method of claim 1 further comprising the steps of:
    driving the motor/generator as an electric motor to rotate the compressor at a higher rotational speed than the rotational speed of the engine, and
    driving the motor/generator as an electric generator to rotate the compressor at a lower rotational speed than the rotational speed of the engine.

6. The method of claim 5, further comprising the step of:
    supplying an electric power to the motor/generator from an electric generator connected to the engine when the motor/generator is driven as an electric motor.

7. The method of claim 6, further comprising the step of:
    stopping the electric generator when an accelerator pedal is full open or almost full open.

8. The method of claim 5, further comprising the step of:
controlling the amount of electric power generated by the motor/generator when the motor/generator is driven as an electric generator.

9. The method of claim 1, further comprising the step of:
performing a response assignment control to generate a motor command that is used for driving the motor/generator so that a supercharged pressure converges to a desired value.

10. The method of claim 1, further comprising the step of:
adjusting an opening angle of a throttle valve provided in the intake air system to control the amount of intake air to the engine.

11. The method of claim 10, further comprising the step of:
performing a response assignment control to determine the opening angle of the throttle valve so that the amount of intake air to the engine converges to a desired value.

12. The method of claim 1, further comprising the step of:
preventing reverse rotation of the compressor through use of a one-way clutch provided between the motor/generator and the compressor.

13. A supercharger of an engine, the supercharger comprising:
motor/generator means;
compression means for compressing air introduced into an intake air system of the engine;
planetary gear means including a sun gear, at least one planetary gear, and a ring gear, the sun gear rotating in accordance with a driving shaft of the engine, the at least one planetary gear rotating in accordance with the motor/generator means and the ring gear rotating in accordance with the compression means; and
driving means for driving the motor/generator means to control a rotational speed of the at least one planetary gear, wherein the rotational speed of the ring gear is controlled independently of the sun gear, and wherein the control of the rotational speed of the at least one planetary gear allows a rotational speed of the compression means to be controlled independently of a rotational speed of the engine.

14. The supercharger of claim 13, wherein the motor/generator means is connected to a carrier which defines orbital motion of the at least one planetary gear relative to the sun gear.

15. The supercharger of claim 13, wherein the driving means further comprises means for driving the motor/generator means so that the compression means rotates at a higher rotational speed than the rotational speed of the engine when a requested driving force of the engine exceeds a predetermined value.

16. The supercharger of claim 13, wherein the driving means further comprises means for driving the motor/generator means so that the compression means rotates at a lower rotational speed than the rotational speed of the engine or so that the rotation of the compression means stops when a requested driving force of the engine is less than a predetermined value.

17. The supercharger of claim 13, wherein the driving means further comprises means for driving the motor/generator means as an electric motor to rotate the compression means at a higher rotational speed than the rotational speed of the engine, and wherein the driving means further comprises means for driving the motor/generator means as an electric generator to rotate the compressor at a lower rotational speed than the rotational speed of the engine.

18. The supercharger of claim 17, further comprising:
electric generation means for generating electric power and means for causing the electric generation means to supply an electric power to the motor/generator means to drive the motor/generator means as an electric motor.

19. The supercharger of claim 18, further comprising:
means for stopping the generation of the electric power by the electric generation means when an accelerator pedal is full open or almost full open.

20. The supercharger of claim 17, further comprising:
means for controlling the amount of electric power generated by the motor/generator means when the motor/generator means is driven as an electric generator.

21. The supercharger of claim 13, further comprising:
means for performing a response assignment control to generate a motor command that is used for driving the motor/generator means so that a supercharged pressure converges to a desired value.

22. The supercharger of claim 13, further comprising:
means for adjusting an opening angle of a throttle valve to control the amount of intake air to the engine.

23. The supercharger of claim 22, further comprising:
means for performing a response assignment control to determine the opening angle of the throttle valve so that the amount of intake air to the engine converges to a desired value.

24. The supercharger of claim 13, further comprising:
a one-way clutch means for preventing reverse rotation of the compression means.

25. A supercharger of an engine, the supercharger comprising:
a motor/generator;
a compressor provided in an intake air system of the engine;
a planetary gear mechanism including a sun gear connected to a driving shaft of the engine, at least one planetary gear connected to the motor/generator and a ring gear connected to the compressor; and
a controller for driving the motor/generator to control a rotational speed of the at least one planetary gear, wherein the rotational speed of the ring gear is controlled independently of the sun gear, and
wherein control of the rotational speed of the at least one planetary gear allows a rotational speed of the compressor to be controlled independently of a rotational speed of the engine.

26. The supercharger of claim 25, wherein the motor/generator is connected to a carrier which defines orbital motion of the at least one planetary gear relative to the sun gear.

27. The supercharger of claim 25, wherein the controller drives the motor/generator so that the compressor rotates at a higher rotational speed than the rotational speed of the engine when a requested driving force of the engine exceeds a predetermined value.

28. The supercharger of claim 25, wherein the controller drives the motor/generator so that the compressor rotates at a lower rotational speed than the rotational speed of the engine or so that the rotation of the compressor stops when a requested driving force of the engine is less than a predetermined value.

29. The supercharger of claim 25, wherein the controller drives the motor/generator as an electric motor when the controller rotates the compressor at a higher rotational speed than the rotational speed of the engine, and wherein the controller drives the motor/generator as an electric generator when the controller rotates the compressor at a lower rotational speed than the rotational speed of the engine.

30. The supercharger of claim 29, further comprising an electric generator connected to the engine, wherein the controller causes the electric generator to supply an electric power to the motor/generator when the controller drives the motor/generator as an electric motor.

31. The supercharger of claim 30, wherein the controller stops the electric generator when an accelerator pedal is full open or almost full open.

32. The supercharger of claim 29, wherein the controller further controls the amount of electric power generated by the motor/generator when the controller drives the motor/generator as an electric generator.

33. The supercharger of claim 25, wherein the controller performs a response assignment control to generate a motor command that is used for driving the motor/generator so that a supercharged pressure converges to a desired value.

34. The supercharger of claim 25, wherein the controller further adjusts an opening angle of a throttle valve provided in the intake air system to control the amount of intake air to the engine.

35. The supercharger of claim 34, wherein the controller performs a response assignment control to determine the opening angle of the throttle valve so that the amount of intake air to the engine converges to a desired value.

36. The supercharger of claim 25, further comprising a one-way clutch provided between the motor/generator and the compressor.

* * * * *